US012158721B2

(12) United States Patent
Agata et al.

(10) Patent No.: US 12,158,721 B2
(45) Date of Patent: Dec. 3, 2024

(54) IMAGE FORMING APPARATUS CONTROLLING IMAGE FORMING AND SUPPLY OPERATIONS

(71) Applicant: CANON KABUSHIKI KAISHA, Tokyo (JP)

(72) Inventors: Shinichi Agata, Shizuoka (JP); Hisashi Taniguchi, Shizuoka (JP); Keitaro Nakata, Shizuoka (JP); Takuto Kobayashi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/136,027

(22) Filed: Apr. 18, 2023

(65) Prior Publication Data

US 2023/0341806 A1 Oct. 26, 2023

(30) Foreign Application Priority Data

Apr. 19, 2022 (JP) ................................ 2022-069006

(51) Int. Cl.
*G03G 15/00* (2006.01)
*G03G 9/097* (2006.01)

(52) U.S. Cl.
CPC ......... *G03G 15/80* (2013.01); *G03G 9/09791* (2013.01); *G03G 15/5008* (2013.01)

(58) Field of Classification Search
USPC .......................................................... 399/75
See application file for complete search history.

(56) References Cited

U.S. PATENT DOCUMENTS

| | | | | |
|---|---|---|---|---|
| 9,778,583 | B2 | 10/2017 | Terauchi et al. | |
| 2020/0150555 | A1* | 5/2020 | Ikada | G03G 15/0812 |
| 2020/0409297 | A1* | 12/2020 | Ikada | G03G 15/5037 |

FOREIGN PATENT DOCUMENTS

| | | | |
|---|---|---|---|
| JP | 2012-8465 | A | 1/2012 |
| JP | 2012-58548 | A | 3/2012 |
| JP | 2016-38591 | A | 3/2016 |
| JP | 2021-6837 | A | 1/2021 |
| JP | 2021-6839 | A | 1/2021 |

* cited by examiner

*Primary Examiner* — Quana Grainger
(74) *Attorney, Agent, or Firm* — Venable LLP

(57) ABSTRACT

An image forming apparatus includes a rotatable image bearing member, a charging member, a developing member, a cleaning member, an accommodating portion, and a controller capable of executing an image forming operation and a supplying operation for supplying a metal soap, accommodated in the accommodating portion, onto a surface of the image bearing member by the developing member. The controller carries out control so that when the supplying operation is executed, a surface moving speed of the image bearing member is higher than a surface moving speed of the image bearing member when the image forming operation is executed.

17 Claims, 6 Drawing Sheets

(a)

(b)

(a)

(b)

(a)

(b)

IMAGE FORMING APPARATUS CONTROLLING IMAGE FORMING AND SUPPLY OPERATIONS

FIELD OF THE INVENTION AND RELATED ART

The present invention relates to an image forming apparatus. The image forming apparatus forms an image on a recording material (recording medium) with use of an electrophotographic image forming type process. As an example of the image forming apparatus, a copying machine, a printer (laser beam printer, LED printer, or the like), a facsimile machine, a word processor, a multi-function machine (multi-function printer), and the like are encompassed.

As an electrophotographic photosensitive member used in the image forming apparatus of the electrophotographic type, an organic photosensitive member has become widespread based on advantages of inexpensiveness and high productivity.

The organic photosensitive member is constituted by providing, on a supporting member, a photosensitive layer (organic photosensitive layer) using an organic material as a photoconductive material (charge generating substance, charge transporting substance). To the photosensitive member, an electrical external force or a mechanical external force is directly applied in each of steps of charging, exposure, developing, transfer, and cleaning, and therefore, durability against these external forces is required. Specifically, durability against generation of surface scars and abrasion (wearing) by these eternal forces, i.e., scratch resistance and abrasion (wear) resistance, is required.

However, when a surface of the photosensitive member has high hardness in order to acquire the abrasion resistance, the surface of the photosensitive member is not readily abraded, so that an electric discharge product such as ozone or NOx generated by electric discharge at the photosensitive member surface by the charging is not readily removed from the photosensitive member surface. As a result, friction coefficient of the surface of the photosensitive member becomes high, so that a torque becomes high. When the torque becomes high, a load on a driving motor becomes large, so that an amount of electric power increases and the motor is not readily actuated. Therefore, an increase in torque may desirably be suppressed. As a method of suppressing the increase in torque of the photosensitive member having the high hardness, for example, in Japanese Laid-Open Patent Application 2021-6839, a method in which a metal soap is contained in a developer and is supplied from a developer carrying member to the photosensitive member surface is disclosed. Specifically, zinc stearate which is the metal soap is supplied to the surface of the photosensitive member by the developer carrying member and thus the photosensitive member surface is coated with the zinc stearate, so that deposition of the electric discharge product is suppressed.

However, in the conventional technique, in the case where a rotational speed of the photosensitive member and a rotational speed of a developing roller when the metal soap is supplied are slower than those during an image forming operation, a lubricating property of the metal soap supplied to the photosensitive member surface becomes insufficient some instances. This insufficient lubricating property of the metal soap is conspicuous in the case where the friction coefficient of the photosensitive member surface is high and there is a need to supply the metal soap in a large amount in an initial stage and in the case where the metal soap is consumed and is decreased in supply amount in the final stage of a life time thereof. When the supply of the metal soap becomes insufficient, there is a liability that an increase in torque occurs.

SUMMARY OF THE INVENTION

The present invention has been accomplished in the above-described circumstances.

A principal object of the present invention is to suppress an increase in torque due to insufficient supply of a metal soap to a photosensitive member surface.

According to an aspect of the present invention, there is provided an image forming apparatus comprising: a rotatable image bearing member on which surface an electrostatic latent image is formed; a charging member configured to electrically charge the surface of the image bearing member before the electrostatic latent image is formed; a developing member configured to form a developer image by developing the electrostatic latent image, formed on the surface of the image bearing member with a developer, in contact with the image bearing member; a cleaning member configured to remove the developer on the image bearing member in contact with the image bearing member; an accommodating portion configured to accommodate the developer containing a metal soap; and a controller configured to carry out control so as to be capable of executing an image forming operation for forming the developer image on a recording material and a supplying operation for supplying the metal soap, accommodated in the accommodating portion, onto the surface of the image bearing member by the developing member, wherein the controller carries out control so that when the supplying operation is executed, a surface moving speed of the image bearing member is higher than a surface moving speed of the image bearing member when the image forming operation is executed.

Further features of the present invention will become apparent from the following description of exemplary embodiments with reference to the attached drawings.

BRIEF DESCRIPTION OF THE DRAWINGS

Parts (a) and (b) of FIG. 1 are schematic sectional views of an image forming apparatus and a process cartridge, respectively, in embodiments 1 and 2.

Figure 3:
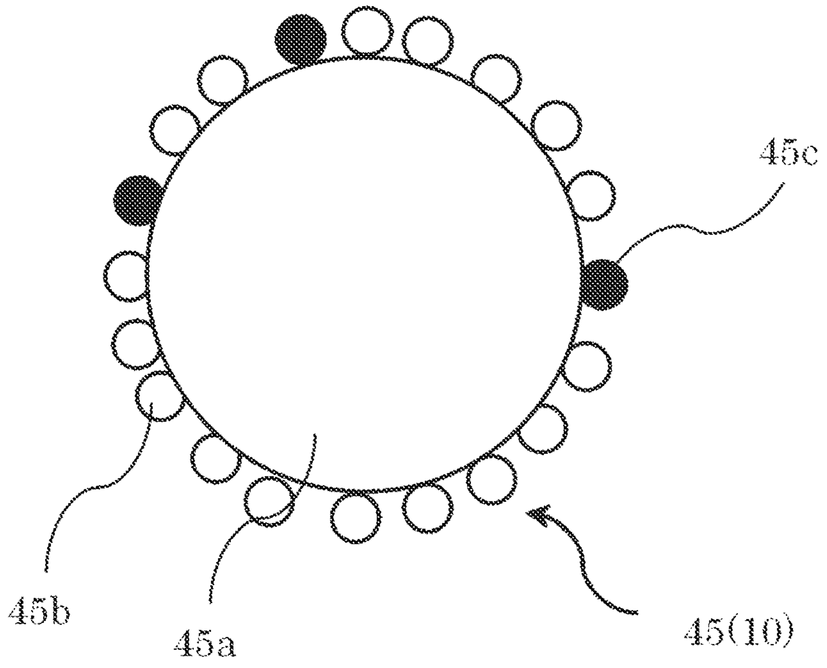
Figure 3:
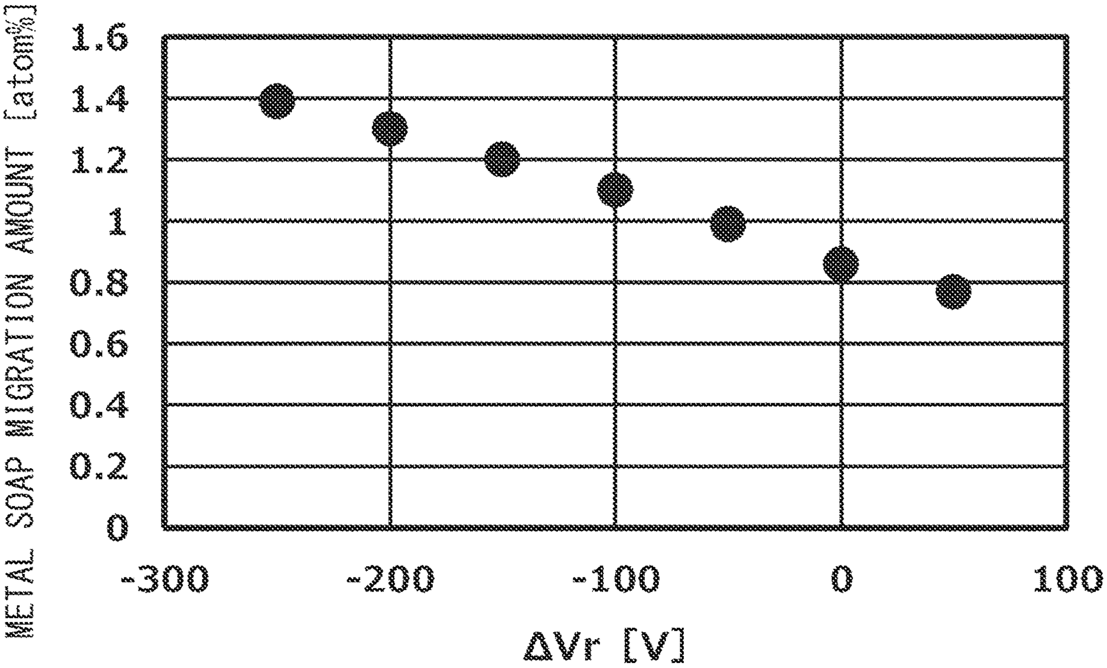

Parts (a) and (b) of FIG. 3 are a schematic view of toner in the embodiments 1 and 2 and a graph for illustrating a relationship between ΔVr and a migration amount of a metal soap in the embodiment 1, respectively.

Figure 4:
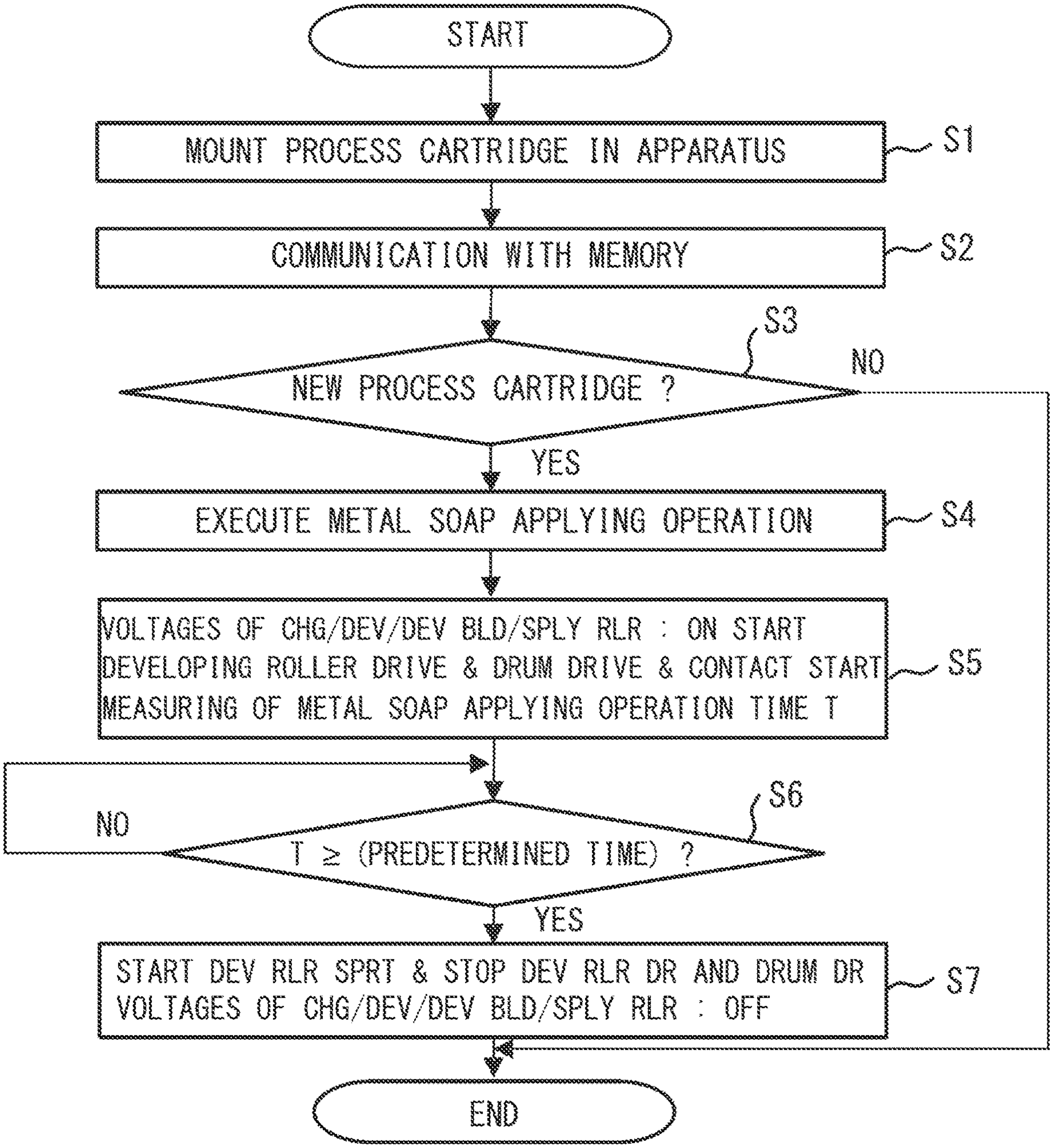

FIG. 4 is a flowchart showing a metal soap supplying operation in the embodiment 1.

Parts (a) and (b) of Figure S are graphs for illustrating a relationship between a DD peripheral speed ratio and a metal soap migration amount and a relationship between the DD peripheral speed ratio and a fog amount on a photosensitive drum, respectively, in the embodiment 2.

Figure 6:
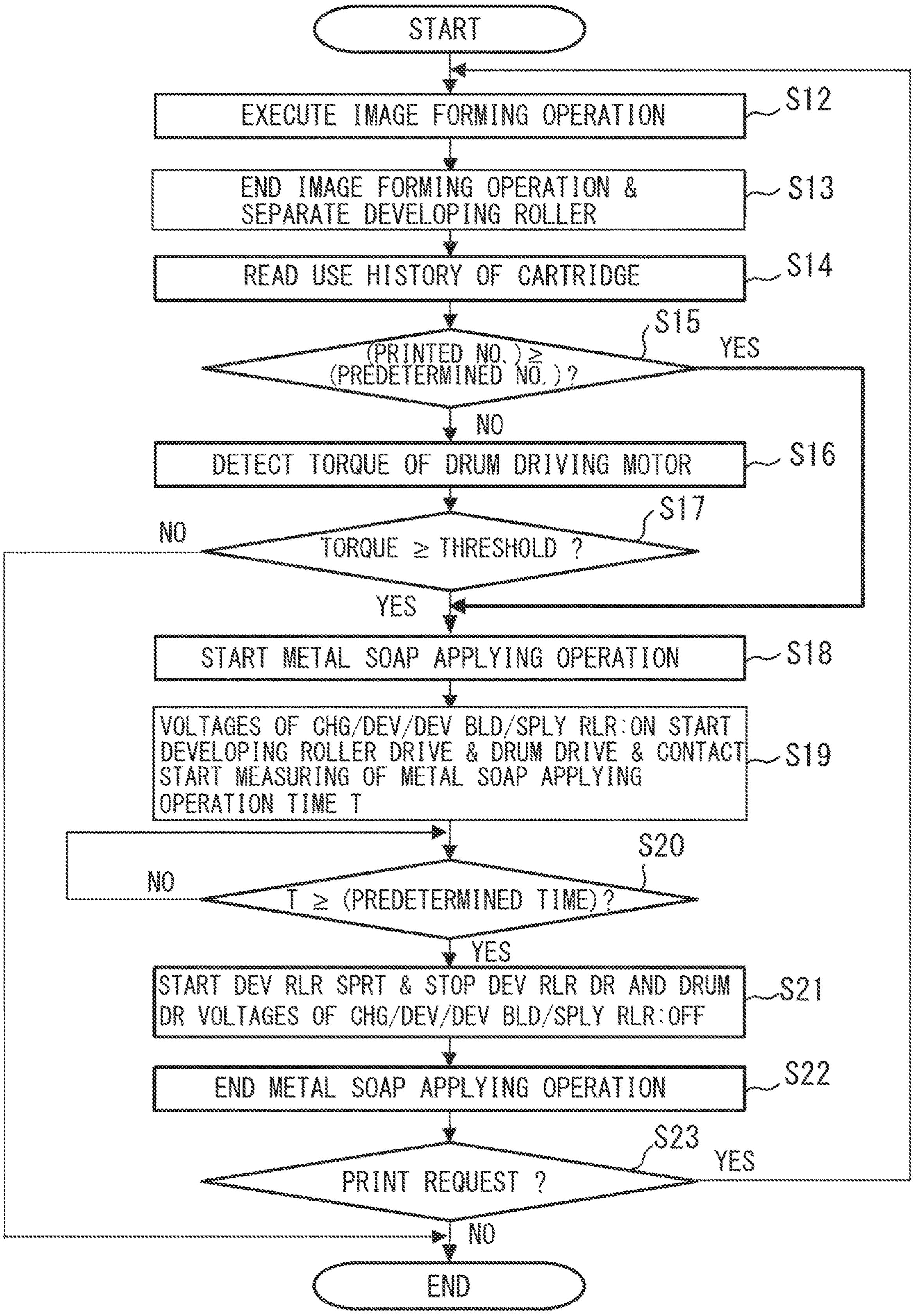

FIG. 6 is a flowchart showing a metal soap supplying operation in the embodiment 2.

DESCRIPTION OF THE EMBODIMENTS

In the following, exemplary embodiments of the present invention will be described with reference to the drawings.

Incidentally, the following embodiments are exemplification, and the present invention is not limited to contents of the following embodiments. Further, in the respective drawings, constituent elements unnecessary to illustrate the respective embodiments will be omitted from the drawings.

[1. Image Forming Apparatus]

Figure 1:
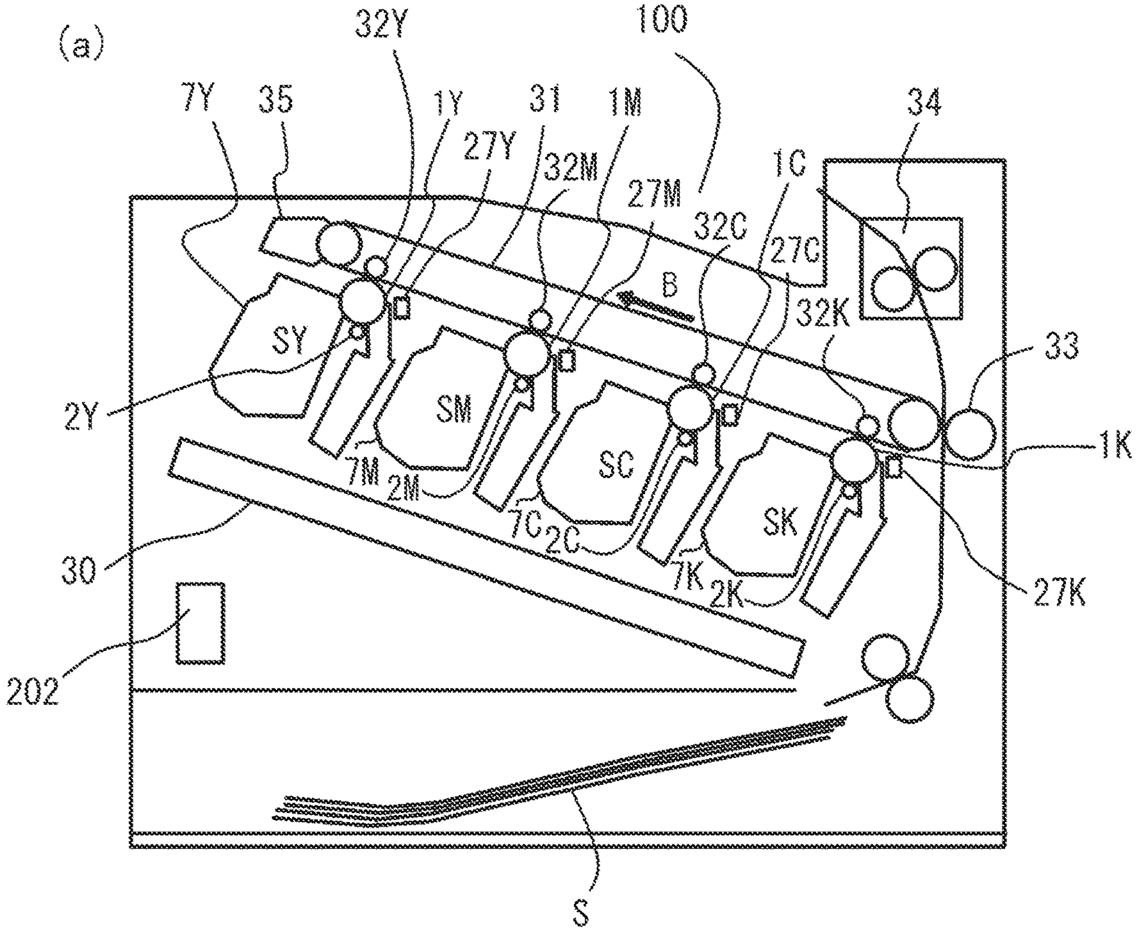
Figure 1:
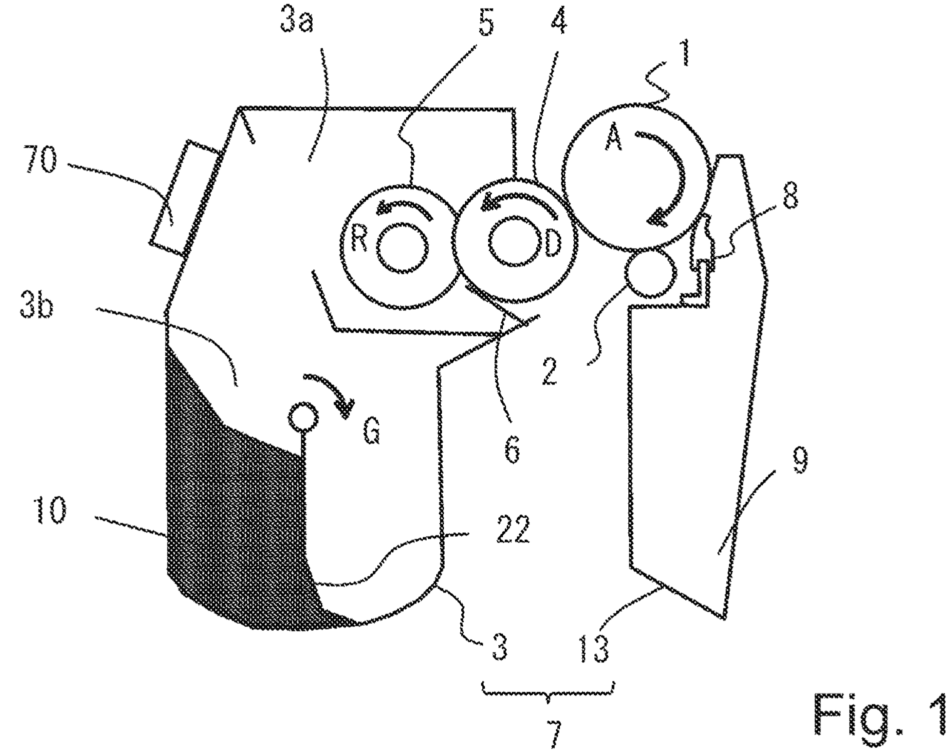

A general structure of an image forming apparatus of an electrophotographic type according to an embodiment 1 will be described. Part (a) of FIG. 1 is a schematic sectional view of an image forming apparatus 100 of the embodiment 1. The image forming apparatus 100 of this embodiment is a full-color laser printer employing an intermediary transfer type process. The image forming apparatus 100 is capable of forming a full-color image on a recording material S (for example, a recording sheet, a plastic sheet, a cloth, and so on) in accordance with image information. The image information is inputted from a host device (not shown), such as an image reading device (not shown) connected to the image forming apparatus 100 or a personal computer communicatably connected to the image forming apparatus 100, to the image forming apparatus 100.

The image forming apparatus 100 includes first to fourth image forming portions SY, SM, SC, and SK for forming images of colors of yellow (Y), magenta (M), cyan (C), and black (K), respectively. In the following, to members contributing formation of respective color toner images, suffixes, Y, M, C, and K for discriminating the colors are added, but are omitted in some instances except for the case where the members for a specific color are described. In the embodiment 1, the image forming apparatus 100 includes four photosensitive drums 1 which are drum-type electrophotographic photosensitive members juxtaposed as a plurality of image bearing members in a direction crossing a vertical direction. Each of the photosensitive drums 1 is assembled with the image forming portion S, so that a process cartridge 7 is formed.

A rotatable photosensitive drum 1, which is the image bearing member on which surface an electrostatic latent image is formed, is rotationally driven in an arrow A direction in part (b) of FIG. 1 by a driving motor 80 (see FIG. 2), which is a driving means. A charging roller 2, which is a charging member, is a single-layer roller comprising an electroconductive core metal and an electroconductive rubber layer, and for example, 7.5 mm in outer diameter φ and 103 to 106 Ω·cm in volume resistivity. Further, by applying a charging voltage of, for example, −1000 V to the charging roller 2 by a charging voltage power source 71 (see FIG. 2), which is a first voltage applying means (described later), the surface of the photosensitive drum 1 is electrically charged uniformly to −500 V. To the charging roller 2, a DC voltage consisting of Vd+Vth is applied, so that the surface of the photosensitive drum 1 (image bearing member) is uniformly charged by a charging potential Vd by electric discharge. The potential Vd at this time is referred to as a dark portion potential, and is −500 V, for example. Vth is a discharge start voltage, and when an applied charging voltage is small, the surface potential on the photosensitive drum 1 is not increased by the electric discharge, but the surface potential starts to increase from the discharge start voltage Vth by the electric discharge. That is, the discharge start voltage Vth in this embodiment is −500 V.

After the surface of the photosensitive drum 1 is charged by the charging roller 2, the surface of the photosensitive drum 1 is irradiated with laser light from an exposure unit 30. The exposure unit 30 is an exposure means for forming an electrostatic latent image on the surface of the photosensitive drum 1 by irradiating the photosensitive drum surface with the laser light on the basis of the image information. The surface of the photosensitive drum 1 irradiated with the laser light is changed in surface potential to VI which is a light portion potential of, for example, −100 V, so that the electrostatic latent image is formed.

(Process Cartridge)

Part (b) of FIG. 1 is a sectional view of the process cartridge 7 in this embodiment as viewed along a longitudinal direction (rotational axis direction) of the photosensitive drum 1. The process cartridge 7 is constituted by a developing unit 3 and a photosensitive drum unit 13. In the developing unit 3, a developing roller 4, which is a developing member, and a toner supplying roller 5, which is a supplying member, are provided. In the developing unit 3, a developing chamber **3*a*, a toner accommodating portion 3*b*, which is an accommodating portion, a developing blade 6, and a toner feeding member 22 for feeding toner 10, which is a developer, to the developing chamber 3*a* by being rotated in an arrow G direction, are provided. By receiving a driving force of a driving motor (not shown), the developing roller 4 and the supplying roller 5 start rotation in an arrow D direction and an arrow R direction, respectively, in part (b) of FIG. 1. Then, to the developing roller 4, as a developing voltage, for example, a voltage of −300 V is applied from a developing power source 72 (see FIG. 2), which is a second voltage applying means. By this, to the electrostatic latent image formed on the surface of the photosensitive drum 1, i.e., to the above-described portion of the light portion potential VI, the toner 10 is supplied by the developing roller 4, so that the electrostatic latent image is developed. In this embodiment, as the driving motor for the developing roller 4 and the supplying roller 5, a driving motor other than the driving motor for the photosensitive drum 1 is used, but a common driving motor 80** may be used.

The process cartridge 7 includes a non-volatile memory 70 which is a storing portion used during a metal soap supplying operation (supplying operation) (described later). In the non-volatile memory 70, a use history of the process cartridge 7, for example, information of a new article flag, which is information indicating whether or not the process cartridge 7 is a new article, is stored. The new article flag shows that the process cartridge 7 is the new article when the new article flag is 0 and shows that the process cartridge 7 is under use, not the new article, when the new article flag is 1, for example. Incidentally, a mode of the information, on whether or not the process cartridge 7 is the new article, stored in the non-volatile memory 70 is not limited thereto. Further, in part (b) of FIG. 1, the developing unit 3 is illustrated so as to include the non-volatile memory 70, but the photosensitive drum unit 13 may include the non-volatile memory 70. The non-volatile memory 70 may only be required to be disposed so as to establish communication with a controller 202 (described later).

A developer image (toner image) formed on the surface of the photosensitive drum 1 by development is transferred onto an intermediary transfer belt 31, which is an intermediary transfer member shown in part (a) of FIG. 1. The intermediary transfer belt 31 is formed with an endless belt as the intermediary transfer member which opposes the photosensitive drum 1 of each image forming portion S and which is for transferring the toner image from the photosensitive drum 1 onto the recording material S. The intermediary transfer belt 31 contacts the photosensitive drum 1 of each image forming portion S and is circulated and moved (rotated) in an arrow B direction (counterclockwise direction) in part (a) of FIG. 1. Incidentally, the intermediary transfer belt 31 may have a constitution in which the intermediary transfer belt 31 is capable of being contacted to and separated from the photosensitive drum 1.

On an inner peripheral surface side of the intermediary transfer belt 31, primary transfer rollers 32 which are transfer members as primary transfer means are provided opposed to the associated photosensitive drums 1, respectively. To each of the primary transfer rollers 32, a voltage of a polarity opposite to a normal charge polarity of the toner is applied from a primary transfer voltage power source 73 which is a fourth voltage applying means. By this, the toner image on the photosensitive drum 1 is transferred (primary-transferred) onto the intermediary transfer belt 31. The polarity of the toner is a negative polarity as a normal polarity. Accordingly, it is possible to execute the primary transfer by applying a voltage of a positive polarity as a primary transfer voltage.

Further, on an outer peripheral surface side of the intermediary transfer belt 31, a secondary transfer roller 33 as a secondary transfer means is provided. To the secondary transfer roller 33, a voltage of the polarity opposite to the polarity of the toner is applied from a secondary transfer voltage power source 74 as a secondary transfer voltage applying portion. By this, the toner image is transferred (secondary-transferred) from the intermediary transfer belt 31 onto the recording material S. In the following, a position where the toner image is secondary-transferred onto the recording material S is referred to as a secondary transfer portion. For example, during full-color image formation, the above-described processes are successively executed in the image forming portions SY, SM, SC, and SK, so that toner images of the respective colors are successively primary-transferred superposedly onto the intermediary transfer belt 31. Thereafter, the recording material S is conveyed to the secondary transfer portion in synchronism with movement of the intermediary transfer belt 31. Then, by the action of the secondary transfer roller 33 contacting the intermediary transfer belt 31 via the recording material S, the four color toner images on the intermediary transfer belt 31 are collectively secondary-transferred onto the recording material S. The recording material S on which the unfixed toner images are transferred is conveyed to the fixing device 34. In the fixing device 34, heat and pressure are applied, so that the toner images are fixed on the recording material S. Then, the recording material S is discharged to an outside of the image forming apparatus 100.

On the other hand, a surface potential of the photosensitive drum 1 after the toner image (toner) is transferred therefrom onto the intermediary transfer belt 31 becomes non-uniform by applying the primary transfer voltage to the photosensitive drum 1. Therefore, the surface potential of the photosensitive drum 1 which becomes non-uniform by the last image formation is uniformized by subjecting the surface of the photosensitive drum 1 to whole-surface exposure (while-surface light irradiation) by the pre-exposure unit 27 which is a pre-exposure means. That is, the surface of the photosensitive drum 1 is irradiated with light so as to remove residual electric charges on the surface of the photosensitive drum 1. The pre-exposure unit 27 is disposed between a side downstream of the primary transfer portion which is the contact position between the intermediary transfer belt 31 and the photosensitive drum 1 with respect to the rotational direction of the photosensitive drum 1 and a side upstream of a charging portion which is a contact position between the charging roller 2 and the photosensitive drum 1 with respect to the rotational direction of the photosensitive drum 1. The pre-exposure unit 27 exposes, to light, the photosensitive drum 1 which is an opposing portion. As a light source of the pre-exposure unit 27, for example, an LED, a halogen lamp, or the like can be used. The light source used is not particularly limited, but from the viewpoints that a driving voltage is low and that downsizing of the apparatus is easy, the use of the LED is preferred. Therefore, in the embodiment 1, as the light source for the pre-exposure unit 27, the LED is used.

Further, toner remaining on the surface of the photosensitive drum 1 without being transferred by the primary transfer roller 32 is removed from the surface of the photosensitive drum 1 by the cleaning blade 8 which is a cleaning member contacting the photosensitive drum 1 (see part (b) of FIG. 1). The toner removed by the cleaning blade 8 is accommodated into a residual toner accommodating chamber 9 provided below the cleaning blade 8. Toner remaining on the intermediary transfer belt 31 without being transferred onto the recording material S by the secondary transfer roller 33 is conveyed to and removed by a belt cleaning device 35 as a cleaning device for the intermediary transfer belt 31. The controller 202 will be described later. Incidentally, the image forming apparatus in which the metal soap supplying operation in the embodiment 1 is executed is not limited to the image forming apparatus 100 shown in part (a) of FIG. 1.

[2. Control Mode of Image Forming Apparatus]

Figure 2:
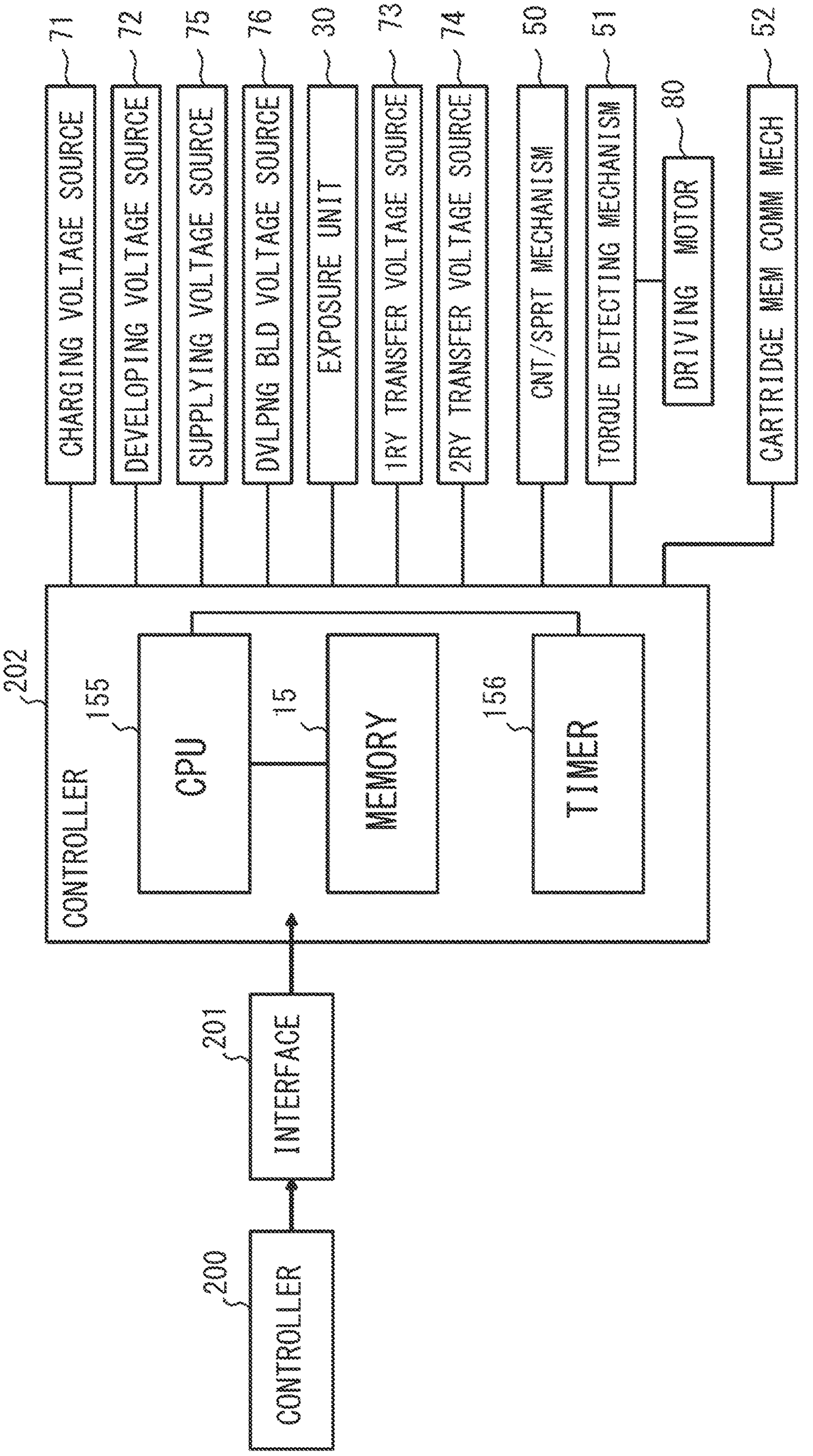
FIG. 2 is a schematic block diagram showing a control mode of the image forming apparatus of the embodiments 1 and 2.

FIG. 2 is a block diagram showing a schematic control mode of a principal part of the image forming apparatus 100 of this embodiment. The controller 202 is a control means for controlling an operation of the image forming apparatus 100, and sends and receives various electric information signals. Further, the controller 202 executes processing of the electric information signals inputted from various process devices and various sensors and processing of instruction signals to the various process devices. The controller 200 not only transfers various pieces of electric information between itself and a host device (not shown), but also causes the controller (control portion) 202 to integrally control the image forming operation of the image forming apparatus 100 via an interface 201 in accordance with a predetermined control program or a predetermined reference table. The controller 202 is constituted by including a CPU 155 which is a central element for performing various arithmetic processing, a memory 15 such as a RAM and a ROM, which are storing elements, a timer 156 for a metal soaping supply time, and the like. In the RAM, a detection result of the sensor, a count result of a counter, an arithmetic result, and the like are stored, and in the ROM, the control program, a data table acquired by an experiment or the like in advance, and the like are stored. To the controller 202, various control objects, the sensors, the counters, and the like are connected.

The controller 202 carries out control or the like of a predetermined image forming sequence by controlling the transfer of various electric information signals and drive timings of the respective portions. For example, the controller 202 controls the following high-voltage power sources and devices in order to form the toner image on the photosensitive drum 1. The controller 202 carries out control of a charging voltage power source 71 for applying the charging voltage, a developing power source 72 for applying the developing voltage, and a supplying voltage power source 75, which is a third voltage applying means for the supplying roller 5, for supplying the toner supply voltage. Further, the controller 202 controls a developing blade voltage power source 76 which is a power source of the developing blade 6 which is a toner regulating member. Further, the controller 202 controls the exposure unit 30 and the like. Further, the controller 202 controls a primary transfer voltage power source 73, a secondary transfer voltage power source 74, and the like in order to form the toner image on the recording material S. Further, the controller 202 controls a contact and separation mechanism 50 for managing contact and separation between the developing roller 4 and the photosensitive drum 1, a torque detecting mechanism 51, which is a detecting means for the driving motor 80 of the photosensitive drum 1, and a cartridge memory communicating mechanism 52 for establishing communication with the non-volatile memory 70. In the embodiment 1, the controller 202 controls the above-described power sources for performing the metal soap supplying operation (described later specifically). The controller 202 carries out control so as to be capable of executing the image forming operation for forming the toner image on the recording material S and the metal soap supplying operation for supplying a metal soap 45*c*, accommodated in the toner accommodating portion 3*b*, onto the surface of the photosensitive drum 1 by the developing roller 4.

[3. Schematic Structure of Process Cartridge]

A general structure of the process cartridge 7 mounted in the image forming apparatus 100 will be described using part (b) of FIG. 1. The process cartridge 7 is detachably mountable to the image forming apparatus 100 via a mounting guide (not shown), a positioning member (not shown), and the like mounted in the image forming apparatus 100. In other words, the process cartridge 7 is capable of being inserted into and extracted from the image forming apparatus 100. In the embodiment 1, the process cartridges 7 for the respective colors have the same shape. In these process cartridges 7, toners 10 of the colors of yellow (Y), magenta (M), cyan (C), and black (K) are accommodated. In this embodiment, the process cartridge 7 will be described, but a constitution including a developing cartridge in which the developing unit 3 is singly detachably mountable to the image forming apparatus 100 may be employed. Incidentally, in this embodiment, structures and operations of the process cartridges 7 for the respective colors are substantially the same except for a kind (color) of the toner 10 accommodated.

The process cartridge 7 includes the developing unit 3 provided with the developing roller 4 and the like, and the photosensitive drum unit 13 provided with the photosensitive drum 1. In this embodiment, the developing unit 3 and the photosensitive drum unit 13 are integrally assembled into the process cartridge 7, but the present invention is not limited thereto.

For example, these units may be constituted as a developing cartridge and a photosensitive drum cartridge, respectively, each detachably mountable to the image forming apparatus 100.

The developing unit 3 is roughly divided into the developing chamber 3*a* and the toner accommodating portion 3*b*. The toner accommodating portion 3*b* is provided with the toner feeding member 22 for feeding the toner 10 to the developing chamber 3*a*.

The toner feeding member 22 feeds the toner 10 to the developing chamber 3*a* by being rotated in an arrow G direction in part (b) of FIG. 1. In the developing chamber 3*a*, the developing roller 4 as a toner carrying member rotating in an arrow D direction in contact with the photosensitive drum 1 is provided. In this embodiment, the developing roller 4 and the photosensitive drum 1 are rotated so that their surfaces move in the same direction in an opposing developing portion. Inside the developing chamber 3*a*, the supplying roller 5 and the developing blade 6 are disposed. The supplying roller 5 supplies, to the developing roller 4, the toner 10 fed from the toner accommodating portion 3*b*. The developing blade 6 is a toner regulating member for performing coating amount regulation of and electric charge impartment to the toner 10 on the developing roller 4 supplied by the supplying roller 5.

To each of the developing roller 4, the supplying roller, and the developing blade 6, an independent voltage is applied from the associated power source (see FIG. 2). The toner 10 supplied to the developing roller 4 by the supplying roller 5 is charged by friction between the developing roller 4 and the developing blade 6, so that electric charges are imparted to the toner 10 and a layer thickness of the toner 10 is regulated. The toner 10 on the developing roller 4 regulated in layer thickness is conveyed to the opposing portion to the photosensitive drum 1 by rotation of the developing roller 4, and the electrostatic latent image on the photosensitive drum 1 is developed and visualized as the toner image.

During the image forming operation, a predetermined DV voltage (developing voltage: Vdc) applied to the developing roller 4 is −300 V. Further, by applying a voltage (supply voltage: Vr=−350 V) to the supplying roller 5, a potential difference (ΔVr) between the supplying roller 5 and the developing roller 4 is adjusted, so that a supply amount of the toner 10 to the developing roller 4 is adjusted. In the embodiment 1, ΔVr=Vdc−Vr is set at +50 V (=−300V−(−350V)), so that a potential setting in which negatively chargeable toner is liable to move from the supplying roller 5 to the developing roller 4 is made.

When the electrostatic latent image on the photosensitive drum 1 is developed and visualized, the developing roller 4 is rotationally driven so as to contact a peripheral surface. This is because the metal soap externally added to the toner as described later is made easy to be supplied to the photosensitive drum 1. When the constitution is a constitution in which the metal soap can be supplied to the photosensitive drum 1, the constitution is not limited to the constitution in which the developing roller 4 and the photosensitive drum 1 are in contact with each other.

Here, in the following description, as regards the potential and the applied voltage, a state in which an absolute value thereof is large on a negative-polarity side (for example, −1000 V relative to −500 V) is referred to as that "potential is high", and a state in which the absolute value thereof is small on the negative-polarity side (for example, −300 V relative to −500 V) is referred to as that "potential is low". This is because the negatively chargeable toner 10 in the embodiment 1 is considered as a reference. Further, the voltage in the embodiment 1 is expressed as a potential difference relative to the ground potential (0 V). Accordingly, the developing voltage=−300 V is interpreted as that a potential difference of −300 V is provided by the developing voltage applied to a core metal of the developing roller 4. This is true for other voltages.

To the photosensitive drum unit 13, the photosensitive drum 1 is rotatably mounted via bearings (not shown). The photosensitive drum 1 is rotationally driven in an arrow A direction in part (b) of FIG. 1 by receiving a driving force of the driving motor 80. Further, in the photosensitive drum unit 13, the charging roller 2 and the cleaning blade 8 as a plate-like elastic member are disposed so as to contact the peripheral surface of the photosensitive drum 1. The cleaning blade 8 is fixed to a metal plate at one end thereof and is contacted to the photosensitive drum 1 at the other (free) end thereof with respect to a counter direction to rotation of the photosensitive drum 1, so that the cleaning blade 8 forms a cleaning nip which is a contact portion between itself and the photosensitive drum 1. The surface of the photosensitive drum 1 is rubbed with the cleaning blade 8, so that the toner 10 and fine particles which remain in the transfer step are removed and are accommodated in the residual toner accommodating portion 9. By this, image defects due to contamination of the charging roller 2 and movement of the toner 10 by the photosensitive drum 1 are prevented from occurring.

[4. Structure of Photosensitive Drum]

The photosensitive drum 1 is constituted by a cylindrical metal support member having electroconductivity, a conductive layer that serves as an undercoat layer of the support member, photosensitive layers (charge generation layer and charge transport layer) formed on the undercoat layer, and a protective layer formed on the photosensitive layer. The photosensitive drum 1 is constituted by providing a photosensitive material, such as an organic photo-semiconductor (OPC), amorphous selenium, or amorphous silicon, on a cylindrical drum base composed of aluminum, nickel, or the like having an outer diameter φ of 24 mm and serving as a supporting member. Furthermore, the photosensitive drum 1 in the embodiment 1 has a wear-resistant protective layer as the outermost surface layer in order to improve the wear resistance. The protective layer improves durability.

The protective layer may preferably contain electroconductive particles and/or a charge transport substance and a resin.

Examples of the electroconductive particles may include particles of metal oxides such as titanium oxide, zinc oxide, tin oxide, and indium oxide. Examples of the charge transport material may include polycyclic aromatic compounds, heterocyclic compounds, hydrazone compounds, styryl compounds, enamine compounds, benzidine compounds, triarylamine compounds, and resins having groups derived from these substances. Among these, triarylamine compounds and benzidine compounds are preferable. Examples of the resin may include polyester resins, acrylic resins, phenoxy resins, polycarbonate resins, polystyrene resins, phenolic resins, melamine resins, and epoxy resins. Among these, polycarbonate resins, polyester resins, and acrylic resins are preferable.

The protective layer may be formed as a cured film obtained by polymerizing a composition that contains a monomer having a polymerizable functional group. Examples of the reaction for this process may include a thermal polymerization reaction, a photopolymerization reaction, and a radiation polymerization reaction. Examples of the polymerizable functional group in the monomer having a polymerizable functional group may include an acrylic group and a methacrylic group. As the monomer having the polymerizable functional group, a material having a charge transport property may be used.

The protective layer may contain additives such as an antioxidant, a UV absorber, a plasticizer, a leveling agent, a lubrication imparting agent, and a wear resistance improver. Specific examples thereof may include hindered phenol compounds, hindered amine compounds, sulfur compounds, phosphorus compounds, benzophenone compounds, siloxane-modified resins, silicone oil, fluororesin particles, polystyrene resin particles, polyethylene resin particles, silica particles, alumina particles, and boron nitride particles. The protective layer may preferably have an average thickness of 0.5 μm or more and 10 μm or less and may more preferably have an average thickness of 1 μm or more and 7 μm or less.

The protective layer can be formed by preparing a protective layer-forming coating solution containing the aforementioned materials and a solvent, forming a coating film of this coating solution, and drying and/or curing the coating film. Examples of the solvent used in the coating solution may include alcohol solvents, ketone solvents, ether solvents, sulfoxide solvents, ester solvents, and aromatic hydrocarbon solvents. In the embodiment 1, the average thickness of the protective layer was set at 3 μm.

[5. Structure of Toner]

Part (a) of FIG. 3 is a schematic view of the toner 10 used in the embodiment 1. In the embodiment 1, an inorganic particle-added toner 45 obtained by externally adding inorganic silicon **45*b* indicated by a white circle to a base particle 45*a*** in order to ensure flowability and improve chargeability is used. The toner used in the embodiment 1 is a non-magnetic one-component particle polymerized toner having a negative chargeability and has an average particle size of 7 μm.

Further, a metal soap **45*c* indicated by a black circle is externally added in addition to the inorganic silicon 45*b* in order to reduce friction coefficient of the surface of the photosensitive drum 1. Incidentally, only a part of the inorganic silicon 45*b* and only a part of the metal soap 45*c* are represented by reference numerals or symbols. Originally, the electric discharge product is high in adhesiveness and increases the friction coefficient of the surface of the photosensitive drum 1, but by supplying the metal soap 45*c* to the surface of the photosensitive drum 1, deposition of the electric discharge product on the photosensitive drum 1** is suppressed, so that the increase in friction coefficient can be suppressed.

The metal soap **45*c* is a generic name for long-chain fatty acids and metal salts other than those of sodium and potassium. Specific examples thereof may include metal salts between fatty acids, such as stearic acid, myristic acid, lauric acid, ricinoleic acid, and octylic acid, and metal species such as lithium, magnesium, calcium, barium, and zinc. For example, the metal soap Sc may be that the metal species is at least one of zinc, calcium, and magnesium. In the embodiment 1, zinc stearate is externally added as the metal soap 45*c*. Incidentally, the kind of the metal soap 45*c* is not limited to this, and lead stearate, cadmium stearate, barium stearate, calcium stearate, aluminum stearate, zinc stearate, magnesium stearate, zinc laurate, zinc myristate, and the like are also usable. At least one metal soap selected from these may be used. For example, the metal soap 45*c*** may be at least one species of zinc stearate, calcium stearate, and magnesium stearate.

The external addition amount of the metal soap **45*c* may preferably be 0.6 wt (weight) % or less. The larger the external addition amount, the higher the effect of suppressing the deposition of the electric discharge product on the photosensitive drum 1, but excessive external addition lowers the flowability of the toner and decreases the image density of the latter half of the image. This is a phenomenon called solid followability failure in which, when a solid black image is output, the followability lowers toward a trailing end of the image. Here, the tailing end refers to an end portion of the image, formed on the recording material S, on an upstream side with respect to a feeding direction of the recording material S. On the other hand, the external addition amount of the metal soap 45*c* may desirably be 0.05 wt % or more. If the amount is smaller, the effect of the metal soap 45*c*** is not readily exhibited.

The average particle size of the metal soap **45*c* may preferably be 0.15 μm or more and 2.0 μm or less. When the average particle size of the metal soap 45*c* is less than 0.15 m, the metal soap 45*c* is not readily applied onto the surface of the photosensitive drum 1. This phenomenon is particularly conspicuous when there are grooves in the surface of the photosensitive drum 1 described below. On the other hand, when the particle size is larger than 2.0 μm, the particles cannot pass through the developing blade 6 and the like in the developing unit 3, and are left inside the developing chamber 3***a*, and thus the particles are not readily supplied to the surface of the photosensitive drum 1. Hereinafter, as regards the toner in the embodiment 1, it will be used as a generic name of a combination of the base particle 45*a* and the external additives (the inorganic silicon 45*b* and the metal soap 45*c*).

The method for measuring the average particle size of the metal soap 45*c* will be described. To 0.5 g of the metal soap 45*c*, 10 ml of ethanol was added, and the resulting mixture was ultrasonically dispersed for 5 minutes with an ultrasonic disperser manufactured by Nippon Seiki Co., Ltd. Next, ethanol was circulated as the measurement solvent. Then, to a Microtrac laser diffraction/scattering particle size distribution analyzer (SPA type) manufactured by Nikkiso Co., Ltd., the obtained dispersion liquid of the metal soap 45*c* was added until the value DV (diffracted light quantity) that related to the scattered light quantity integrated value of the particles reached 0.6 to 0.8. The particle size distribution in this state was measured, and the median diameter obtained as the cumulative median diameter, in other words, the 50% diameter, was assumed to be the average particle size.

The metal soap 45*c* having the above-described average particle size may be produced by, for example, a double decomposition process that involves causing an aqueous solution of a fatty acid salt to react with an aqueous solution or a dispersion liquid of an inorganic metal salt. In the embodiment 1, zinc stearate having an average particle size of 0.60 μm was used. Zinc stearate that served as the metal soap 45*c* was deposited on the toner particles by being charged to a polarity opposite to the toner, and is supplied onto the photosensitive drum 1 during non-image formation.

Next, the method for producing the toner particles will be described. A known technique can be used to produce the toner particles, and a kneading and pulverizing method and a wet manufacturing method can be used. From the viewpoints of uniform particle size and shape controllability, the wet manufacturing method may preferably be used. Further, as the wet manufacturing method, a suspension polymerization method, a dissolution suspension method, an emulsion polymerization aggregation method, and an emulsion aggregation method may be used.

In the embodiment 1, the suspension polymerization method will be described. In the suspension polymerization method, first, a polymerizable monomer composition is prepared by uniformly dissolving or dispersing a polymerizable monomer for generating a binder resin, and other additives, such as a coloring agent, as needed by using a dispersing machine such as a ball mill or an ultrasonic dispersing machine. This step is referred to as a step of preparing the polymerizable monomer composition. During this step, a polyfunctional monomer, a chain transfer agent, wax serving as a parting agent, a charge control agent, a plasticizer, and the like can be added as appropriate and necessary. Examples of the polymerizable monomer used in the suspension polymerization method may include the following vinyl-based polymerizable monomers: styrene; styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octyl styrene, p-n-nonyl styrene, p-n-decylstyrene, p-n-dodecylstyrene, p-methoxystyrene, and p-phenylstyrene; acryl-based polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate. 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxyethyl acrylate; methacrylic-based polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; methylene aliphatic monocarboxylic acid esters; vinyl esters such as vinyl acetate, vinyl propionate, vinyl benzoate, vinyl butyrate, and vinyl formate; vinyl ethers such as vinyl methyl ether, vinyl ethyl ether, and vinyl isobutyl ether; and ketones such as vinyl methyl ketone, vinyl hexyl ketone, and vinyl isopropyl ketone.

Next, the above-described polymerizable monomer composition is injected into an aqueous medium prepared in advance, and droplets formed of the polymerizable monomer composition are formed to have the desired toner particle size by using a stirrer or a dispersing machine that has a high shear force. This step is referred to as a particle forming step. The aqueous medium in the particle forming step may preferably contain a dispersion stabilizer in order to control the particle sizes of the toner particles, yield a sharp particle size distribution, and suppress coalescence of toner particles during the manufacturing process. In general, the dispersion stabilizer is roughly categorized into a polymer that exhibits a repelling force due to steric hindrance and a hardly water-soluble inorganic compound that stabilizes the dispersion by an electrostatic repelling force. The fine particles of the hardly water-soluble inorganic compound dissolve in acids and alkalis and thus can be easily removed by washing with and dissolving in an acid or an alkali after the polymerization, thus being suitably used.

The dispersion stabilizer of the hardly water-soluble inorganic compound may preferably contain one selected from magnesium, calcium, barium, zinc, aluminum, and phosphorus. More preferably, the dispersion stabilizer of the sparingly water-soluble contains magnesium, calcium, aluminum, or phosphorus. Specific examples are as follows: magnesium phosphate, tricalcium phosphate, aluminum phosphate, zinc phosphate, magnesium carbonate, calcium carbonate, magnesium hydroxide, calcium hydroxide, aluminum hydroxide, calcium metasilicate, calcium sulfate, barium sulfate, and hydroxyapatite.

The dispersion stabilizer described above may be used in combination with an organic compound, for example, polyvinyl alcohol, gelatin, methyl cellulose, methyl hydroxypropyl cellulose, ethyl cellulose, carboxymethyl cellulose sodium salt, or starch. These dispersion stabilizers can be used in an amount of 0.01 part by weight or more and 2.00 parts by weight or less relative to 100 parts by weight of the polymerizable monomer.

Furthermore, in order to make these dispersion stabilizers finer, 0.001 part by weight or more and 0.1 part by weight or less of a surfactant may be used in combination relative to 100 parts by weight of the polymerizable monomer. Specifically, commercially available nonionic, anionic, and cationic surfactants can be used. For example, sodium dodecyl sulfate, sodium tetradecyl sulfate, sodium pentadecyl sulfate, sodium octyl sulfate, sodium oleate, sodium laurate, potassium stearate, and calcium oleate may preferably be used.

After or during the particle forming step, the temperature may preferably be set to 50° C. or more and 90° C. or less so as to polymerize the polymerizable monomer contained in the polymerizable monomer composition, so that a toner particle dispersion liquid is obtained. This step is referred to as a polymerizing step. In the polymerizing step, stirring may preferably be performed to make the temperature distribution inside the reactor uniform. In the case where a polymerization initiator is added, the addition can be carried out at an arbitrary timing and in an arbitrary required time. In order to obtain a desired molecular weight distribution, the temperature may be elevated in the latter half of the polymerization reaction. Moreover, in order to remove the unreacted polymerizable monomer to outside the system, by-products, and the like, the aqueous medium may be partly distilled away by distillation operation in the latter half of the reaction or after an end of the reaction. The distillation operation can be performed at normal pressure or a reduced pressure.

In general, an oil-soluble initiator is used as the polymerization initiator to be used in the suspension polymerization method. Specific examples are as follows: azo compounds such as 2,2'-azobisisobutyronitrile, 2,2'-azobis-2,4-dimethylvaleronitrile, 1,1'-azobis (cyclohexane-1-carbonitrile), and 2,2'-azobis-4-methoxy-2,4-dimethylvaleronitrile; and peroxide-based initiators such as acetylcyclohexylsulfonyl peroxide, diisopropylperoxycarbonate, decanonyl peroxide, lauroyl peroxide, stearoyl peroxide, propionyl peroxide, acetyl peroxide, tert-butyl peroxy-2-ethyl hexanoate, benzoyl peroxide, tert-butylperoxyisobutyrate, cyclohexanone peroxide, methyl ethyl ketone peroxide, dicumyl peroxide, tert-butyl hydroperoxide, di-tert-butyl peroxide, tert-butyl peroxypivalate, and cumene hydroperoxide.

The polymerization initiator may be used in combination with a water-soluble initiator and specific examples are as follows: ammonium persulfate, potassium persulfate, 2,2'-azobis (N,N'-dimethyleneisobutyroamizine) hydrochloride, 2,2'-azobis (2-aminodinopropane) hydrochloride, azobis (isobutylamizine) hydrochloride, sodium 2,2''-azobisisobutyronitrilesulfonate, ferrous sulfide, and hydrogen peroxide.

These polymerization initiators can be used alone or in combination, and, in order to control the degree of polymerization of the polymerizable monomer, a chain transfer agent, a polymerization inhibitor, and the like can be further added and used. Incidentally, the toner in the present invention may contain an organic silicon polymer in which the number of carbon atoms directly bonded to a silicon atom in the organic silicon polymer is 1 or more and 3 or less. Further, the organic silicon polymer may have a partial structure represented by R—SiO3/2, where R may represent a hydrocarbon group having 1 to 6 carbon atoms or a hydrocarbon group having 1 to 3 carbon atoms.

The water washing migration amount of the inorganic silica is adjusted by using a Henschel Mixer (manufactured by NIPPON COKE & ENGINEERING CO., LTD.) and by changing the external addition amount, the rotation speed (peripheral speed) of a free end of a blade, and the time (duration) for which the blade is rotated, which are the external addition conditions. The external addition conditions of toner a are shown in a table 1 below. Incidentally, details of the peripheral speed and the time, which are the external addition conditions, are as described in Japanese Laid-Open Patent Application 2016-38591. Further, 0.20 wt % of zinc stearate was externally added to the toner a used in the embodiment 1.

TABLE 1

| | Inorganic silicon particles | | | | | | | | | |
|---|---|---|---|---|---|---|---|---|---|---|
| | 1EC*1 | | | | 2EC*2 | | | | MS*3 | |
| Toner | SA [wt. %] | DV | PS [m/s] | Time [sec] | SA [wt. %] | DV | PS [m/s] | Time [sec] | Kind | EAA [wt. %] |
| a | 0.8 | SMD | 40 | 300 | 0.8 | SMD | 40 | 60 | ZS | 0.2 |

*1 "1EC" is a first-stage external addition condition in which "SA" is a silica amount, "DV" is a device, "SMD" is a surface modifying device, and "PS" is a peripheral speed.
*2 "2EC" is a second-stage external addition condition in which "SA" is a silica amount, "DV" is a device, "SMD" is a surface modifying device, and "PS" is a peripheral speed.
*3 "MS" is a metal soap, "ZS" is zinc stearate, and "EAA" is an external addition amount.

In the table 1, conditions of the inorganic silicon particles and the metal soap are shown. As regards the inorganic silicone particles, first-stage and second-stage external addition conditions are shown, in which a silica amount (wt. %) (of 0.8), a device (surface modifying device), a peripheral speed (m/s) (of 40), a time (sec) (of 300 and 60) are shown. As regards the metal soap, a kind (zinc stearate) and an external addition amount (wt. %) (of 0.2) are shown.

[6. Influence of Electric Discharge Production Photosensitive Drum]

In the case where the image forming operation is executed by using the image forming apparatus 100, when the electric discharge is carried out by the charging roller 2, the electric discharge product such as ozone or NOx generates and is deposited on the surface of the photosensitive drum 1 in some instances. The electric discharge product is removed by the cleaning blade 8 or the like contacting the photosensitive drum 1, but in the case where a deposition amount is larger than a removal amount, by a repetitive image forming operation, the electric discharge product is gradually accumulated on the surface of the photosensitive drum 1. In a contact charging type, compared with a corona charging type using a corona charger, an electric discharge amount is small, so that a generation amount of the electric discharge product is small. However, there is a minute gap between the photosensitive drum 1 and the charging roller 2, and therefore, even when the generation amount of the electric discharge product is small, the electric discharge product is liable to be deposited on the surface of the photosensitive drum 1 by physical friction between the photosensitive drum 1 and the charging roller 2. Further, when the electric discharge product is deposited on the surface of the photosensitive drum 1, friction coefficient between the surface of the photosensitive drum 1 and the cleaning blade 8 increases. As a result, a driving torque of the photosensitive drum 1 increases, so that a load on the driving motor becomes large, and this leads to an increase in electric power amount and actuation failure of the driving motor 80.

Therefore, in order to reduce the influence of the electric discharge product, in the embodiment 1, the metal soap 45*c* is supplied to the surface of the photosensitive drum 1, so that a coating film of the metal soap 45*c* is formed on the surface of the photosensitive drum 1 and thus deposition of the electric discharge product is suppressed.

[7. Metal Soap Supplying Operation]

In the embodiment 1, separately from the normal image forming operation, the metal soap supplying operation is executed. A timing of executing the metal soap supplying operation is the case where the process cartridge 7 is a new article, the case where the number of sheets printed is a predetermined number, and the case where a torque during the drive is high, and the metal soap supplying operation is executed during the non-image formation in which the image forming operation is not performed. For example, in this embodiment, the metal soap supplying operation is executed during rotation of the photosensitive drum 1 before the image forming operation or during rotation of the photosensitive drum 1 after the image forming operation. Further, the metal soap supplying operation may also be performed at a timing designated by a user. In this embodiment, the metal soap supplying operation is executed only when the process cartridge 7 is the new article. In other words, the metal soap supplying operation is performed in the case where a new photosensitive drum 1 is mounted in the image forming apparatus 100.

In the metal soap supplying operation, in the case where a use state of the process cartridge 7 is an initial state, the friction coefficient of the surface of the photosensitive drum 1 becomes high, so that the metal soap 45*c* is positively supplied to the surface of the photosensitive drum 1 as soon as possible and thus the friction coefficient is reduced. On the other hand, a blocking layer comprising the external additive is not sufficiently formed yet between the photosensitive drum 1 and the cleaning blade 8, so that cleaning performance is in an unstable state, and therefore, there is a need to carry out control so that supply of the toner is not made.

Therefore, in the metal soap supplying operation, only the metal soap 45*c* is positively supplied, and in order to reduce the friction coefficient of the surface of the photosensitive drum 1, the polarity of the potential difference ΔVr (=Vdc−Vr) of the developing roller 4 relative to the supplying roller 5 may desirably be an opposite polarity to the polarity of the metal soap 45*c*. By making the polarity of ΔVr opposite to the polarity of the charged metal soap 45*c*, the metal soap 45*c* is moved toward the developing roller 4 side, so that movement of the metal soap 45*c* toward the supplying roller 5 side can be suppressed.

For this reason, the metal soap 45*c* in a large amount can be supplied onto the surface of the photosensitive drum 1.

In the embodiment 1, in the metal soap supplying operation, Vdc=−300 V, Vr=−100 V, and ΔVr=−200 V are set. By this, the metal soap 45*c* is charged to the positive polarity, so that the metal soap 45*c* itself is actively moved toward the developing roller 4 side. That is, when the metal soap supplying operation is performed, the controller 202 controls the developing voltage power source 72 and the supplying voltage power source 75 so that a second potential difference is formed in a control portion between the supplying roller 5 and the developing roller 4. Here, the second potential difference refers to a potential difference such that an electrostatic force in a direction from the supplying roller 5 toward the developing roller 4 acts on the metal soap 45*c*.

Further, control is carried out so that the surface potential of the photosensitive drum 1 becomes the dark portion potential Vd under application of the charging voltage, and thus the developing voltage is made equal to the developing voltage during the image forming operation. That is, when the metal soap supplying operation is performed, the controller carried out control so that a first potential difference (black contrast) which is a difference between the surface potential of the photosensitive drum 1 charged by the charging roller 2 and the developing voltage is larger than the first potential difference in the image forming operation. By this, a so-called solid white printing is carried out, so that only the metal soap 45*c* is formed on the photosensitive drum 1 by development.

In actuality, when a migration amount of the metal soap 45*c* onto the surface of the photosensitive drum 1 is measured, as shown in part (b) of FIG. 3, it is understood that the migration amount of the metal soap 45*c* is increased when ΔVr is small (in the case where Vr is further on the positive polarity side than Vdc is). Part (b) of FIG. 3 is a graph in which the abscissa represents ΔVr [V], and the ordinate represents the migration amount [atom % (atom percentage)]. As indicated by black circles (dots) in the graph of part (b) of FIG. 3, it is understood that the migration amount of the metal soap 45*c* increases with a higher value of ΔVr on the negative-polarity side. Incidentally, the migration amount of the metal soap 45*c* onto the surface of the photosensitive drum 1 was measured using a scanning X-ray photoelectron spectroscopic analyzer.

<<Measuring Condition of Scanning X-Ray Photoelectron Spectroscopic Analyzer>>

Analyzer: Scanning X-ray photoelectron spectroscopic analyzer (ESCA system ULVAC PHI 5700 (ULVAC-PHI, Inc.))
Degree of vacuum: 3.99×10−5 Pa or less
X-ray source: Mg radiation source
Scan: Narrow scan
Measuring element: C1s, O1s, Mg2s, Si2p, Zn2p3
X-ray incident angle: 45 degrees
Measuring method: Measured at arbitrary one portion for each of irradiation portion of electron beam or UV radiation of 125 to 260 mm in wavelength and non-irradiation portion of electron beam or UV radiation
Analysis software: "PHI Multi Pak" (trademark) (manufactured by ULVAC-PHI, Inc.)
Smoothing correction: Point 9, Background correction: OFF In "SET" state, a spectrum of each element is displayed and a base line is drawn, and from a resultant spectrum area, an element concentration value (atom %) is calculated.

[8. Control Procedure of Metal Soap Supplying Operation]

With reference to a flowchart of FIG. 4, a control procedure of the metal soap supplying operation will be described. In the embodiment 1, when detection that the process cartridge 7 is a new article is made, the metal soap supplying operation of a step (hereinafter abbreviated as "S") I and later is executed by the controller 202. In S1, the controller 202 detects that the process cartridge 7 is mounted in the image forming apparatus 100. When the process cartridge 7 is mounted in the image forming apparatus 100, the non-volatile memory 70 provided to the process cartridge 7 establishes communication with the controller 202 through a contact point (not shown) with the image forming apparatus 100. In S2, the controller 202 establishes communication with the non-volatile memory 70 of the process cartridge 7 by the cartridge memory communicating mechanism 52. Here, the controller 202 acquires information on a new article flag (for example, "new article" when the flag is 0, and "during use" when the flag is 1) by data communication. In S3, on the basis of the information acquired in S2, the controller 202 discriminates whether or not the mounted process cartridge 7 is the new article (new process cartridge). In the case where the controller discriminated in S3 that the process cartridge 7 is not the new article, there is no need to perform the metal soap supplying operation, and therefore, the processing is ended.

In the case where the controller 202 discriminated in S3 that the process cartridge 7 is the new article, the controller 202 causes the processing to go to S4. In S4, the controller 202 executes the metal soap supplying operation. In S5, the controller 202 applies ("ON") the charging voltage, the developing voltage, the developing blade voltage, and the supplying voltage by the charging voltage power source 71, the developing voltage power source 72, the developing blade voltage power source 76, and the supplying voltage power source 75, respectively. With this control, the controller 202 starts drive of the developing roller 4 and the photosensitive drum 1 and causes the contact and separation mechanism 50 to bring the developing roller 4 into contact with the photosensitive drum 1, and further causes the timer 156 to start measurement of a metal soap supplying operation time T. In S6, the controller 202 makes reference to the timer 156 and discriminates whether or not the metal soap supplying operation time T is a predetermined time or more. In the case where the controller 202 discriminated in S6 that the metal soap supplying operation time T is less than the predetermined time, the controller 202 returns the processing to S6 and continuously executes the metal soap supplying operation. In the case where the controller 202 discriminated in S6 that the metal soap supplying operation time T is the predetermined time or more, the controller 202 causes the processing to go to S7. In S7, the controller 202 causes the contact and separation mechanism 50 to separate the developing roller 4 from the photosensitive drum 1, and stops the drive of the developing roller 4 and the photosensitive drum 1. Further, the controller 202 causes the charging voltage power source 71, the developing voltage power source 72, the developing blade voltage power source 76, and the supplying voltage power source 75 to turn off ("OFF") the charging voltage, the developing voltage, the developing blade voltage, and the supplying voltage, respectively, and thus ends the metal soap supplying operation. In the embodiment 1, the predetermined time was set at 120 sec, for example. The predetermined time is not limited to 120 sec, but can be appropriately set. The predetermined time may only be required to be set at a time required for supplying the metal soap 45*c* in an amount such that the frictional force between the photosensitive drum 1 and the cleaning blade 8 is reduced. Incidentally, a constitution in which each primary transfer roller 32 can be contacted to and separated from the intermediary transfer belt is employed, so that the primary transfer roller 32 may be separated from the intermediary transfer belt in the metal soap supplying operation.

[9. Verification of Effect of Embodiment 1]

An experiment conducted for demonstrating an effect of the embodiment 1 will be described. In this experiment, in a low temperature/low humidity environment (temperature: 15° C./humidity: 10% RH) in which contamination of the charging roller 2 is liable to occur, low-print-ratio intermittent image formation of 1000 sheets was carried out, and then evaluation of a torque and contamination of the charging roller 2 was made. In this low-print-ratio intermittent image formation, lateral lines of 1% in image ratio were printed on recording materials S. In the metal soap supplying operation in the embodiment 1, the following surface movement speed difference was provided between the surface of the developing roller 4 and the surface of the photosensitive drum 1. The surface movement speed difference refers to a difference between a rotational speed of the developing roller 4 at the surface of the developing roller 4 (hereinafter, referred to as the surface movement speed) and the surface movement speed of the photosensitive drum 1. In the following, a ratio of the surface movement speed of the developing roller 4 to the surface movement speed of the photosensitive drum 1 is referred to as a photosensitive drum peripheral speed ratio.

The rotational speed of the photosensitive drum 1 was set so as to be 1.2 times (magnification to a maximum rotational speed in a plurality of image forming operations) the rotational speed during the image forming operation, and the rotational speed of the developing roller 4 was set so as to be the same (magnification to a maximum rotational speed in the plurality of image forming operations) as the rotational speed during the image forming operation. Further, the DD peripheral speed ratio was set at 75%. That is, in the embodiment 1, the controller 202 carries out control so that when the metal soap supplying operation is performed, the surface movement speed of the photosensitive drum 1 is higher (larger) than the surface movement speed of the photosensitive drum 1 when the image forming operation is performed. In a comparison example 1-1 as an example compared in effect with the embodiment 1, the metal soap supplying operation was not performed when the process cartridge 7 is a new article. In the metal soap supplying operation in a comparison example 1-2, the rotational speed of the photosensitive drum 1 was ¼ time the rotational speed of the photosensitive drum 1 during the image forming operation, the rotational speed of the developing roller 4 was ⅓ time the rotational speed of the developing roller 4 during the image forming operation, and the DD peripheral speed ratio was set at 120%. In the metal soap supplying operation in a comparison example 1-3, the rotational speed of the photosensitive drum 1 was ¼ time the rotational speed of the photosensitive drum 1 during the image forming operation, the rotational speed of the developing roller 4 was the same as the rotational speed of the developing roller 4 during the image forming operation, and the DD peripheral speed ratio was set at 360%.

<Verification Result 1>

In a table 2, a verification result is shown.

TABLE 2

| | | | COMP. EX | | |
|---|---|---|---|---|---|
| | | EMB.1 | 1-1 | 1-2 | 1-3 |
| SO*[1] | PDRS*[4] | 1.2 | 0 | ¼ | ¼ |
| | DRRS*[5] | 1 | 0 | ⅓ | 1 |
| | DDPSR*[6] | 75% | 0 | 120% | 360% |
| IS*[2] | T*[7] | ○ | xx | x | ○ |
| | C*[8] | ○ | x | x | x |
| 1K*[3] | T*[7] | ○ | Δ | Δ | ○ |
| | C*[8] | ○ | x | x | x |

*[1]"SO" is the supplying operation.
*[2]"IS" is the initial stage.
*[3]"1K" is 1000 sheets.
*[4]"PDRS" is the photosensitive drum rotational speed (ratio) (unit:time(s))
*[5]"DRRS" is the developing roller rotational speed (ratio) (unit:time)
*[6]"DDPSR" is the DD peripheral speed ratio (unit:%).
*[7]"T" is the torque.
*[8]"C" is the contamination.

In the table 2, second to fifth columns represent verification results of the embodiment 1, the comparison example 1-1, the comparison example 1-2, and the comparison example 1-3, respectively. In a first column, various conditions in the metal soap supplying operation and evaluation items (torque and contamination) in the initial stage and after 1000 sheets (1K) are shown. The various conditions include the rotational speed of the photosensitive drum 1, the rotational speed of the developing roller 4, and the DD peripheral speed ratio. In evaluation of the torque and the contamination, "○" represents a state in which a high torque status or the contamination of the charging roller 2 did not occur or was regarded as being a non-occurrence state thereof. "Δ" represents that although the high torque status or the contamination of the charging roller occurred, these levels fell within an allowable range. "x" represents that the high torque status or the contamination of the charging roller 2 occurred. "xx" represents that the high torque status or the contamination of the charging roller 2 occurred and a degree thereof was conspicuous.

In the embodiment 1, an increase in torque and an image defect due to the contamination of the charging roller 2 did not occur until 1000 sheets. The reason for this will be described. In the metal soap supplying operation when the process cartridge 7 is the new article, the rotational speed of the photosensitive drum 1 is 1.2 times the rotational speed of the photosensitive drum 1 during the image formation.

For this reason, a contact pressure of the cleaning blade 8 contacting the photosensitive drum 1 in a counter direction to the rotational direction of the photosensitive drum 1 is increased when compared with the contact pressure during the image formation. The metal soap **45*c* is strongly pressed against the photosensitive drum 1, and therefore, a coating film can be formed effectively on the surface of the photosensitive drum 1**, so that after the metal soap supplying operation, the increase in torque was suppressed and thus the image defect did not occur.

On the other hand, in the comparison example 1-1, the metal soap supplying operation was not performed when the process cartridge 7 is the new article, and therefore, the friction coefficient of the surface of the photosensitive drum 1 is high, so that the initial torque was increased. Further, the blocking layer comprising the external additive is not sufficiently formed between the photosensitive drum 1 and the cleaning blade 8, and a cleaning performance is unstable, and therefore, the contamination of the charging roller 2 occurred. At the time when the number of sheets printed is 1000 sheets, although the torque is somewhat lowered, by the influence of the initial torque, a charging failure image due to the contamination of the charging roller 2 occurred.

In the comparison example 1-2, the DD peripheral speed ratio during the metal soap supplying operation is 120%, and therefore, a degree of rolling of the toner 10 increases, so that a contact opportunity between the metal soap **45*c* and the photosensitive drum 1 increases and thus the metal soap 45*c*** is easily transferred onto the photosensitive drum surface.

However, the rotational speed of the developing roller 4 is ⅓ time the rotational speed of the developing roller 4 during the image formation, and therefore, even when the metal soap supplying operation is performed for 120 sec, for example, the number of rotation (travelling distance) of the developing roller 4 is ⅓ time the number of rotation in the embodiment 1. For that reason, in the case where the friction coefficient of the surface of the photosensitive drum 1 in the initial stage is high, supply of the external additive is insufficient, so that the initial torque was increased similarly as in the comparison example 1-1. Further, the blocking layer is not sufficiently formed and the cleaning performance is unstable, and therefore, the contamination of the charging roller 2 occurred.

In the comparison example 1-3, when the metal soap supplying operation was performed for 120 sec, the fog toner was formed in a large amount since the DD peripheral speed ratio was 360% which was large, so that the fog toner passed through the cleaning blade 8. The toner 10 was deposited in a large amount on the charging roller 2, so that the charging failure image due to the contamination of the charging roller 2 occurred. At the time when the number of sheets printed was 1000 sheets, the contamination of the charging roller 2 was stopped, but the charging failure image occurred by the influence of the initial stage.

In the embodiment 1, in the metal soap supplying operation, when the rotational speed of the photosensitive drum 1 was made 1.2 times the rotational speed of the photosensitive drum 1 during the image formation, the contact pressure was temporarily increased, so that a coating film was capable of being formed effectively. However, when the photosensitive drum rotational speed was increased up to the photosensitive drum rotational speed during the image forming operation, the torque during the image formation became excessively high and the rotation of the photosensitive drum 1 became unstable, so that the image defect occurred. For that reason, only during the metal soap supplying operation, the rotational speed of the photosensitive drum 1 is made fast, so that suppression of the increase in torque and an image quality can be compatibly realized. Further, in the embodiment 1, the rotational speed of the developing roller 4 in the metal soap supplying operation was made I time, but is not limited thereto. The metal soap **45*c* can be supplied in a larger amount with a higher rotational speed of the developing roller 4, and therefore, the developing roller rotational speed may desirably be 1 time or more. As described above, in this verification, by executing the metal soap supplying operation described in the embodiment 1, the increase in torque was suppressed, so that the contamination of the charging roller 2** was able to be suppressed.

As described above, according to the embodiment 1, it is possible to suppress the occurrence of the increase in torque due to the insufficient supply of the metal soap to the photosensitive member surface.

In an embodiment 2, as one of methods for more effectively applying the metal soap, an optimum range as to a surface moving speed difference between the surface of the developing roller 4 and the surface of the photosensitive drum 1 will be described. Further, in the embodiment 2, in the non-volatile memory 70, information on a use history of the process cartridge 7, in other words, the photosensitive drum 1 is stored. The information on the use history includes the number of rotation of the photosensitive drum 1 or the number of sheets of the recording materials S subjected to the image forming operation.

[1. Surface Moving Speed During Metal Soap Supplying Operation]

The developing roller 4 contacts the photosensitive drum 1 and forms the developing nip in the developing portion. By providing the surface moving speed difference between the surface of the developing roller 4 and the surface of the photosensitive drum 1, the toner 10 is rotated in the developing nip, so that the metal soap **45*c* is supplied to the photosensitive drum 1. When the DD peripheral speed ratio is increased, the degree of rolling of the toner 10 becomes large, and the contact opportunity between the metal soap 45*c* and the photosensitive drum 1 is increased, so that the coating film of the metal soap 45***c* becomes easy to be formed. Therefore, it is desirable that a state in which the difference between the surface moving speed of the developing roller 4 and the surface moving speed of the photosensitive drum 1 is large is formed.

Figure 5:
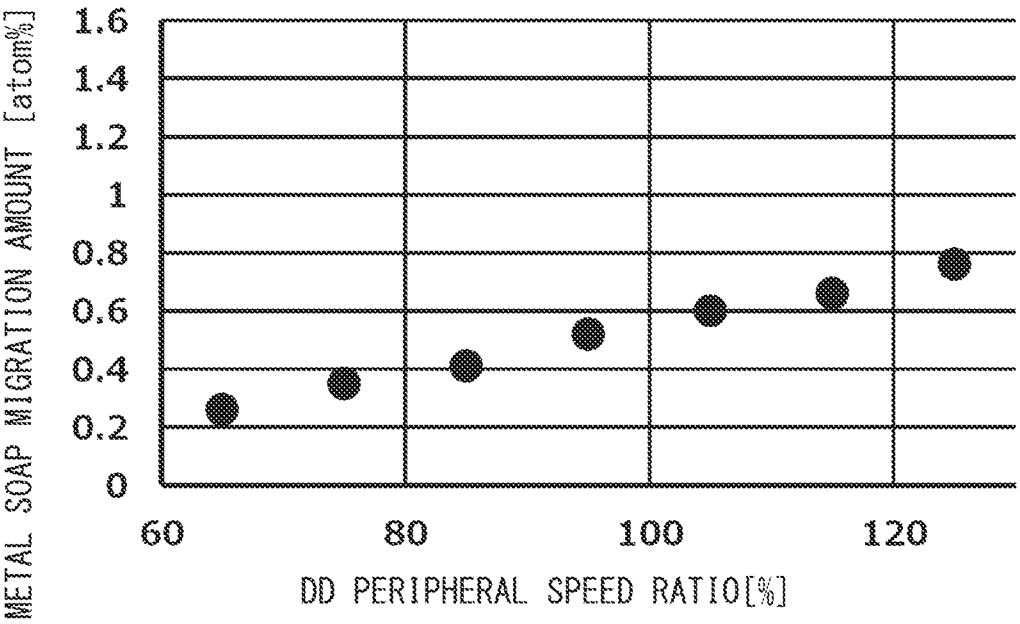
Figure 5:
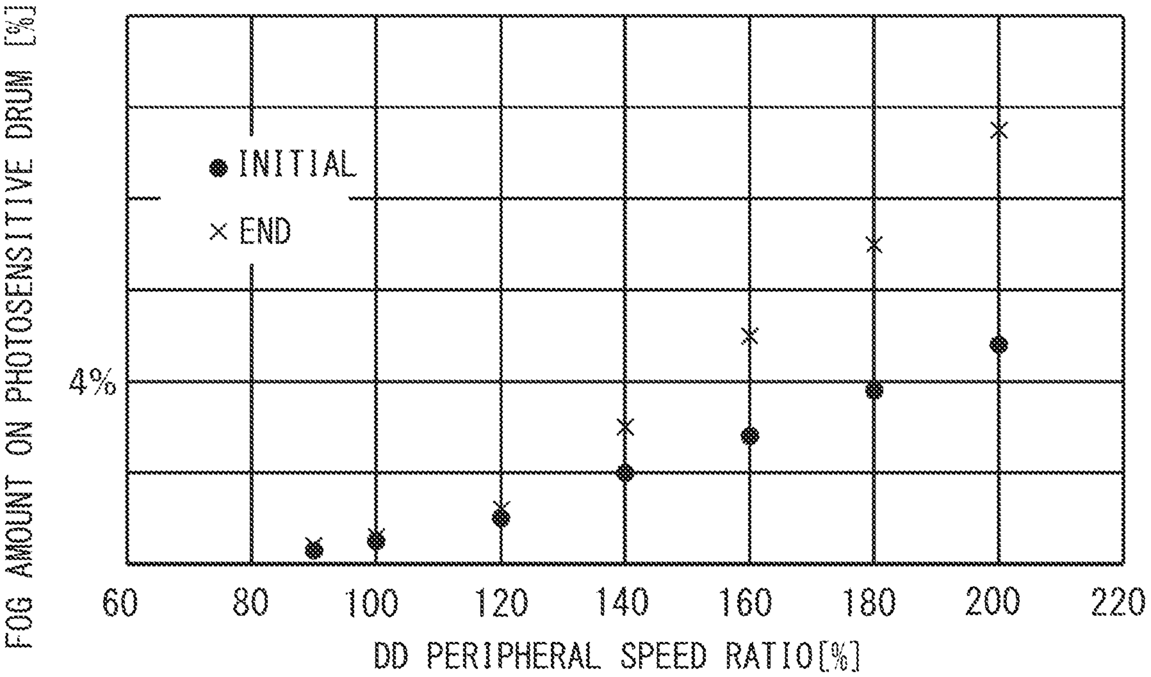

In actuality, when a migration amount of the metal soap 45*c* onto the surface of the photosensitive drum 1 is measured, as shown in part (b) of FIG. 5, it is understood that the migration amount of the metal soap 45*c* is increased with an increasing DD peripheral speed ratio (with rotation of the developing roller 4 faster than the photosensitive drum 1). Part (b) of FIG. 5 is a graph in which the abscissa represents DD peripheral speed ratio [%], and the ordinate represents the migration amount [atom %]. As shown in part (b) of FIG. 5, it is understood that the migration amount of the metal soap 45*c* increases with the increasing DD peripheral speed ratio. The migration amount of the metal soap 45*c* onto the surface of the photosensitive drum 1 was measured using a scanning X-ray photoelectron spectroscopic analyzer similarly as in the embodiment 1.

Incidentally, the DD peripheral speed ratio is one index representing a difference in surface moving speed between the surface of the photosensitive drum 1 and the surface of the developing roller 4, and for example, instead of the DD peripheral speed ratio, a surface moving speed difference (DD peripheral speed difference) may be used as the index. When the DD peripheral speed ratio or the DD peripheral speed difference is changed, the rotational speed of the developing roller 4 may be changed or the rotational speed of the photosensitive drum 1 may be changed.

However, it is also understood that when the image forming operation is always executed in a state in which the DD peripheral speed ratio is large, a degree of the occurrence of the fog is increased by deterioration of the toner. The deterioration of the toner is caused to occur by depletion of the metal soap 45*c* from the developing chamber 3*a* or the toner accommodating portion 3*b* due to excessive supply of the metal soap 45*c* in the initial stage in which use of the process cartridge 7 is started. Further, the deterioration of the toner also causes the following phenomenon. That is, by an advance (continuity) of use of the process cartridge 7, the number of times of the friction of the toner 10 is also increased, and the toner 10 is deteriorated, so that a non-electrostatic depositing force becomes large and thus the toner amount on the developing roller 4 is increased.

When the toner amount on the developing roller 4 is increased, an apparent potential difference between the developing roller 4 and the photosensitive drum 1 is decreased, so that the degree of the occurrence of the fog is increased.

In part (b) of FIG. 5, a relationship between the DD peripheral speed ratio and the fog amount in the initial stage ("INITIAL") and the terminal stage (end) ("END") of the process cartridge 7 in the embodiment 2 is shown. In part (b) of FIG. 5, the abscissa represents the DD peripheral speed ratio [%], and the ordinate represents the fog amount [%] in which the fog occurred on the photosensitive drum 1. In part (b) of FIG. 5, a black circle shows a value in the initial stage of the process cartridge, and X shows a value in the terminal stage in which the use of the process cartridge 7 progresses and which is close to an exchange timing (close to an end of the life time). As shown in part (b) of FIG. 5, the fog amount increases with an increasing DD peripheral speed ratio, and even when the DD peripheral speed ratio is the same, the fog amount increases more in the terminal stage (end) than in the initial stage. When the fog toner is formed on the photosensitive drum 1 in a large amount, there is a liability that the fog toner leads to cleaning failure. In the constitution of the embodiment 2, it is desirable that the DD peripheral speed ratio is used in a range of 60% to 140% so that the value of the fog amount on the photosensitive drum 1 becomes about 4% or less. Further, similarly as in the embodiment 1, control is carried out so that the surface potential of the photosensitive drum 1 becomes the dark portion potential Vd under application of the charging voltage, and the developing voltage is made the same as the developing voltage during the image forming operation, so that so-called solid white printing is executed.

[2. Control Procedure of Metal Soap Supplying Operation]

With reference to a flowchart of FIG. 6, a control procedure of the metal soap supplying operation in the embodiment 2 will be described. In the embodiment 2, in addition to the time of the new article in the embodiment 1, in the case where the print number exceeds a predetermined integrated number of sheets or in the case where the torque during the drive is in a high state, the controller 202 executes the metal soap supplying operation in S12 and later. That is, the controller 202 executes the metal soap supplying operation in the case where information on the use history stored in the non-volatile memory 70 becomes a predetermined number of sheets or in the case where the torque detected by the torque detecting mechanism 51 becomes a predetermined torque or more. Incidentally, in the following description, the controller causes a counter to count the number of sheets of recording materials S printed by the image forming operation after the last metal soap supplying operation is ended (hereinafter, this number of sheets is also referred to as a print integrated number of sheets).

In S12, the controller 202 executes the image forming operation when preparation of image formation by the image forming apparatus 100 is made and a print signal is inputted by a user. In S13, when the image forming operation is ended, the controller causes the contact and separation mechanism 50 to separate the developing roller 4 from the photosensitive drum 1, so that the drive is ended. Further, the controller 202 turns off the charging voltage, the developing voltage, the developing blade voltage, and the supplying voltage by the charging voltage power source 71, the developing voltage power source 72, the developing blade voltage power source 76, and the supplying voltage power source 75, respectively.

In S14, the controller 202 checks the use history of the process cartridge 7 from the non-volatile memory 70 via the cartridge memory communicating mechanism 52. In the non-volatile memory 70 of the process cartridge 7, information on the use history of the process cartridge 7, for example, information on the printed number of sheets (integrated number of sheets) subjected to the image forming operation by using the process cartridge 7 is stored. Incidentally, the use history of the process cartridge 7, in other words, the use history of the photosensitive drum 1 includes the printed number of sheets and the number of rotations of the photosensitive drum 1 or the like.

In S15, on the basis of the information read in S14, the controller 202 discriminates whether or not the print integrated number of sheets from the last metal soap supplying operation is a predetermined number of sheets or more. In S15, in the case where the controller 202 discriminated that the print integrated number of sheets is less than the predetermined number of sheets, the controller 202 causes the processing to go to S16, and in the case where the controller discriminated that the print integrated number of sheets is the predetermined number of sheets or more, the controller 202 causes the processing to go to S18. In S16, the controller 202 makes transition to the torque detecting operation of the driving motor 80 for the photosensitive drum 1. The controller 202 causes the torque detecting mechanism 51 to detect the torque of the driving motor 80 for the photosensitive drum 1. Incidentally, torque detection of the driving motor 80 by the torque detecting mechanism 51 may be executed by a known method. Further, in the embodiment 2, the predetermined number of sheets was set at 1000 sheets. Setting of the predetermined number of sheets may be made so that the predetermined number of sheets is determined from the printed number of sheets or the like in which the fog occurs depending on an individual image forming apparatus.

In S17, the controller 202 discriminates whether or not a torque value of the driving motor 80 detected by the torque detecting mechanism 51 is a predetermined threshold or more. In S202, in the case where the controller 202 discriminated that the detected torque value is the predetermined threshold or more, the controller causes the processing to go to S18, and in the case where the controller discriminated that the detected torque value is less than the predetermined threshold, the controller causes the image forming apparatus to end the printing operation. Incidentally, in the embodiment 2, the predetermined threshold when the controller 202 makes the discrimination of S17 was set at 2.0 kgf·cm. Setting of the predetermined threshold may be made so that the predetermined threshold is determined from a torque value or the like at which the fog occurs depending on an individual image forming apparatus.

In S18, the controller 202 starts the metal soap supplying operation. In S19, the controller 202 applies ("ON") the charging voltage, the developing voltage, the developing blade voltage, and the supplying voltage by the charging voltage power source 71, the developing voltage power source 72, the developing blade voltage power source 76, and the supplying voltage power source 75, respectively. Further, the controller 202 starts drive of the developing roller 4 and the photosensitive drum 1 and causes the contact and separation mechanism 50 to bring the developing roller 4 into contact with the photosensitive drum 1, and further causes the timer 156 to start measurement of a metal soap supplying operation time T.

In S20, the controller 202 makes reference to the timer 156 and discriminates whether or not the metal soap supplying operation time T is a predetermined time or more. In the case where the controller 202 discriminated in S20 that the metal soap supplying operation time T is less than the predetermined time, the controller 202 returns the processing to S20 and continuously executes the metal soap supplying operation. In the case where the controller 202 discriminated in S20 that the metal soap supplying operation time T is the predetermined time or more, the controller 202 causes the processing to go to S21. In S21, the controller 202 causes the contact and separation mechanism 50 to separate the developing roller 4 from the photosensitive drum 1, and stops the drive of the developing roller 4 and the photosensitive drum 1. Further, the controller 202 causes the charging voltage power source 71, the developing voltage power source 72, the developing blade voltage power source 76, and the supplying voltage power source 75 to turn off ("OFF") the charging voltage, the developing voltage, the developing blade voltage, and the supplying voltage, respectively, and thus ends the metal soap supplying operation in S22.

In S23, the controller 202 discriminates whether or not a request of continuous printing is made, and in the case where the controller 202 discriminated in S23 that the continuous printing request is not made, the controller 202 makes transition to a print ending operation and then ends the printing operation. In the case where the controller 202 discriminated in S23 that the continuous printing request is made, the controller 202 causes the processing to return to S12, and repeats the operations $12 to S23. In the embodiment 2, the predetermined time was set at 5 sec. The predetermined time is not limited to S see but can be appropriately set. Incidentally, the metal soap supplying operation in S18 may be performed immediately after the image forming operation in S12 without performing the separating operation of the developing roller 4, and may also be executed in a state in which the application of the various voltages and the drive of the devices are carried out as they are.

[3. Verification of Effect of Embodiment 2]

An experiment conducted for demonstrating an effect of the embodiment 2 will be described. In this experiment, in a low temperature/low humidity environment (temperature: 15° C./humidity: 10% RH) in which contamination of the charging roller 2 is liable to occur, low-print-ratio intermittent image formation of 30000 sheets was carried out, and then evaluation of a torque and contamination of the charging roller 2 was made. In this low-print-ratio intermittent image formation, lateral lines of 1% in image ratio were printed as a recording image. In the metal soap supplying operation in the embodiment 2, the rotational speed of the photosensitive drum 1 was set so as to be 1.2 times a maximum rotational speed in a plurality of image forming operations, and the rotational speed of the developing roller 4 was set so as to be 1.6 times a maximum rotational speed in the plurality of image forming operations. Further, the DD peripheral speed ratio was set at 120%. That is, the controller 202 carries out control so that when the metal soap supplying operation is performed, the rotational speed at the surface of the photosensitive drum 1 is higher (larger) than the rotational speed at the surface of the photosensitive drum 1. In a comparison example 2-1 as an example compared in effect with the embodiment 2, the rotational speed of the photosensitive drum 1 was 1.2 times, the rotational speed of the developing roller 4 was 2.4 times, and the DD peripheral speed ratio was set at 180%. In the metal soap supplying operation in a comparison example 1-2, the rotational speed of the photosensitive drum 1 was 1.2 times, the rotational speed of the developing roller 4 was 0.6 time, and the DD peripheral speed ratio was set at 45%. Further, in the embodiment 2, the rotational speed of the developing roller 4 was 1.6 times the rotational speed of the developing roller 4 in the embodiment 1, and the predetermined time during the new article state was set at 75 sec so that the number of rotations of the developing roller 4 is the same as the number of rotations of the developing roller 4 in the embodiment 1.

<Verification Result 2>

In a table 3, a verification result is shown.

TABLE 3

| | | | COMP. EX | |
|---|---|---|---|---|
| | | EMB.2 | 2-1 | 2-2 |
| SO*[1] | PDRS*[4] | 1.2 | 1.2 | 1.2 |
| | DRRS*[5] | 1.6 | 2.4 | 0.6 |
| | DDPSR*[6] | 120% | 180% | 45% |

TABLE 3-continued

| | | | COMP. EX | |
|---|---|---|---|---|
| | | EMB.2 | 2-1 | 2-2 |
| IS*2 | T*7 | ○ | ○ | Δ |
| | C*8 | ○ | ○ | x |
| 1K*3 | T*7 | ○ | ○ | ○ |
| | C*8 | ○ | x | ○ |

*1"SO" is the supplying operation.
*2"IS" is the initial stage.
*3"30" is 30000 sheets.
*4"PDRS" is the photosensitive drum rotational speed (ratio) (unit:time(s))
*5"DRRS" is the developing roller rotational speed (ratio) (unit:time)
*6"DDPSR" is the DD peripheral speed ratio (unit:%).
*7"T" is the torque.
*8"C" is the contamination.

The table 3 is a table similar to the table 2 in the embodiment 1. Incidentally, in the embodiment 2, the torques and the occurrence status of the contamination of the charging roller in the case where the number of sheets is 30000 (30K) sheets are shown.

In the embodiment 2, until 30000 sheets, not only the increase in torque but also the image defect due to the contamination of the charging roller 2 did not occur. On the other hand, in the comparison example 2-1, in the initial stage, the increase in torque and the contamination of the charging roller 2 did not occur, so that a good result was obtained. However, the DD peripheral speed ratio was 180% which was large, and therefore, when the toner was deteriorated due to continuous use, the fog toner was formed on the photosensitive drum 1 in a large amount and passed through the cleaning blade 8. By this, the toner 10 was deposited on the charging roller 2 in a large amount, so that the charging failure image due to the contamination of the charging roller 2 generated.

In the comparison example 2-2, the DD peripheral speed ratio was 45% which was small (low), and the degree of rolling of the toner 10 became small, so that a contact opportunity between the metal soap 45*c* and the photosensitive drum 1 decreased. Therefore, the coating film of the metal soap 45*c* was not readily formed on the surface of the photosensitive drum 1. Further, the blocking layer comprising the external additive was not sufficiently formed as yet between the photosensitive drum 1 and the cleaning blade 8, so that the cleaning performance was in an unstable state. For that reason, the torque was high in the initial stage, and the charging failure image due to the contamination of the charging roller 2 generated.

Incidentally, in the embodiment 2, the effect was able to be achieved by making the rotational speed of the photosensitive drum 1 in the metal soap supplying operation 1.2 times the rotational speed during the image forming operation and by making the DD peripheral speed ratio in the metal soap supplying operation 120% of the DD peripheral speed ratio during the image forming operation. However, the present invention is not limited thereto, and when the fog toner can be removed depending on the constitution of the process cartridge 7 during the metal soap supplying operation, the DD peripheral speed ratio can be appropriately set at 120% or more.

Further, during the metal soap supplying operation, a light quantity of the pre-exposure unit 27 may preferably be smaller than the light quantity during the image forming operation, particularly the pre-exposure unit 27 may be turned off (the photosensitive drum surface is not irradiated with light). That is, the controller 202 carries out control so that when the metal soap supplying operation is performed, the exposure amount of the pre-exposure unit 27 is smaller than the exposure amount of the pre-exposure unit 27 in the image forming operation. The controller 202 may also cause the pre-exposure unit 27 not to carry out the exposure when the metal soap supplying operation is performed.

When the intermediary transfer belt 31 can be separated from the photosensitive drum 1, by separating the intermediary transfer belt 31 from the photosensitive drum 1, collection of the metal soap 45*c* onto the intermediary transfer belt 31 by a physical depositing force is prevented. The contact and separation of the intermediary transfer belt 31 may be carried out in interrelation with the contact and separation of the primary transfer roller 32. Further, the transfer voltage from the primary transfer voltage power source 73 is made 0 V, so that it also becomes possible to decrease an amount in which the metal soap 45*c* is collected onto the intermediary transfer belt 31 by an electrostatic depositing force. That is, when the metal soap supplying operation is performed, the controller 202 may carry out control so that the intermediary transfer belt 31 is separated from the photosensitive drum 1 and so that the transfer voltage is made 0 V.

As described above, when the DD peripheral speed ratio during the metal soap supplying operation is set within a range (60% to 140%) described in the embodiment 2, it was able to suppress the increase in torque and the contamination of the charging roller 2. That is, the controller carries out control so that a ratio of the rotational speed of the developing roller 4 at the developing roller surface to the rotational speed of the photosensitive drum 1 at the photosensitive drum surface is 60% to 140%.

As described above, according to the embodiment 2, it is possible to suppress the occurrence of the increase in torque due to insufficient supply of the metal soap to the photosensitive drum surface.

According to the present invention, the occurrence of the increase in torque due to the insufficient supply of the metal soap to the photosensitive drum surface can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-069006 filed on Apr. 19, 2022, which is hereby incorporated by reference herein in its entirety.

What is claimed is:

1. An image forming apparatus comprising:

a rotatable image bearing member having a surface on which an electrostatic latent image is formed;

a charging member configured to electrically charge the surface of the image bearing member before the electrostatic latent image is formed;

a developing member configured to form a developer image by developing the electrostatic latent image, formed on the surface of the image bearing member, with a developer, the developing member being in contact with the image bearing member;

a cleaning member configured to remove the developer on the image bearing member, the cleaning member being in contact with the image bearing member;

an accommodating portion configured to accommodate the developer containing a metal soap;

a first voltage applying portion configured to apply a charging voltage to the charging member;

a second voltage applying portion configured to apply a developing voltage to the developing member; and a controller configured to carry out control so as to be capable of executing an image forming operation for forming the developer image on a recording material and a supplying operation for supplying the metal soap, accommodated in the accommodating portion, onto the surface of the image bearing member by the developing member, wherein the controller carries out control so that when the supplying operation is executed, a surface moving speed of the image bearing member is higher than the surface moving speed of the image bearing member when the image forming operation is executed, and wherein the controller carries out control so that a first potential difference, which is a difference between a surface potential of the image bearing member charged by the charging member and the developing voltage, when the supplying operation is executed, is greater than the first potential difference when the image forming operation is executed.

2. An image forming apparatus according to claim 1, wherein the controller carries out control so that when the supplying operation is executed, a surface moving speed of the developing member is higher than the surface moving speed of the image bearing member.

3. An image forming apparatus according to claim 1, wherein the controller carries out control so that a ratio of a surface moving speed of the developing member to the surface moving speed of the image bearing member is 60% to 140%.

4. An image forming apparatus according to claim 1, further comprising:

a supplying member configured to supply the developer accommodated in the accommodating portion to the developing member; and a third voltage applying portion configured to apply a supply voltage to the supplying member, wherein the controller controls the second voltage applying portion and the third voltage applying portion so that when the supplying operation is executed, a second potential difference, such that an electrostatic force in a direction from the supplying member toward the developing member acts on the metal soap, is formed in a contact portion between the supplying member and the developing member.

5. An image forming apparatus according to claim 1, further comprising:

an intermediary transfer member onto which the developer image on the image bearing member is transferred;

a transfer member configured to transfer the developer image from the image bearing member onto the intermediary transfer member; and a pre-exposure unit provided downstream of the transfer member and upstream of the charging member with respect to a rotational direction of the image bearing member and configured to expose the surface of the image bearing member to light, wherein the controller carries out control so that an exposure amount of the pre-exposure unit when the supplying operation is executed is less than an exposure amount of the pre-exposure unit in the image forming operation.

6. An image forming apparatus according to claim 5, wherein the controller carries out control so that exposure by the pre-exposure unit is not executed when the supplying operation is executed.

7. An image forming apparatus according to claim 5, wherein the intermediary transfer member is contactable to and separable from the image bearing member, and wherein the controller carries out control so that the intermediary transfer member is separated from the image bearing member when the supplying operation is executed.

8. An image forming apparatus according to claim 5, further comprising a third voltage applying portion configured to apply a transfer voltage to the transfer member, wherein the controller carries out control so that the transfer voltage is 0 V when the supplying operation is executed.

9. An image forming apparatus according to claim 1, wherein the image bearing member is capable of being inserted into and extracted from the image forming apparatus, and wherein the controller carries out control so that the supplying operation is executed in a case that a new image bearing member is mounted in the image forming apparatus.

10. An image forming apparatus according to claim 1, wherein the developer contains an organic silicon polymer, and wherein a number of carbon atoms directly bonded to a silicon atom of the organic silicon polymer is one or more and three or less.

11. An image forming apparatus according to claim 10, wherein the organic silicon polymer has a partial structure represented by R—SiO3/2 where R represents a hydrocarbon group having 1 to 6 carbon atoms.

12. An image forming apparatus according to claim 1, wherein a metal species of the metal soap is at least one species of zinc, calcium, and magnesium.

13. An image forming apparatus according to claim 12, wherein the metal soap is at least one species of zinc stearate, calcium stearate, and magnesium stearate.

14. An image forming apparatus according to claim 1, wherein the metal soap has a particle size of 0.15 μm or more and 2.0 μm or less.

15. An image forming apparatus according to claim 1, wherein the image bearing member includes a protective layer which is an outermost layer and which is formed of an acrylic resin.

16. An image forming apparatus according to claim 1, further comprising:

a storing portion configured to store information on a use history of the image bearing member;

a driving portion configured to drive the image bearing member; and a detecting portion configured to detect a torque of the driving portion, wherein the controller carries out control so that the supplying operation is executed in a case that the information on the use history stored in the storing portion is a predetermined number of sheets or greater or in a case that the torque detected by the detecting portion is a predetermined torque or higher.

17. An image forming apparatus according to claim 16, wherein the information on the use history includes a number of rotations of the image bearing member or a number of sheets of recording materials subjected to the image forming operation.

* * * * *